(12) United States Patent
Mathiesen et al.

(10) Patent No.: US 12,398,616 B2
(45) Date of Patent: Aug. 26, 2025

(54) FLOW CONTROL DEVICE AND METHOD

(71) Applicant: InflowControl AS, Porsgrunn (NO)

(72) Inventors: Vidar Mathiesen, Porsgrunn (NO); Haavard Aakre, Skien (NO); Bjornar Werswick, Langesund (NO)

(73) Assignee: InflowControl AS, Porsgrunn (NO)

( * ) Notice: Subject to any disclaimer, the term of this patent is extended or adjusted under 35 U.S.C. 154(b) by 433 days.

(21) Appl. No.: 16/979,189

(22) PCT Filed: Mar. 11, 2019

(86) PCT No.: PCT/EP2019/055959
§ 371 (c)(1),
(2) Date: Sep. 9, 2020

(87) PCT Pub. No.: WO2019/175078
PCT Pub. Date: Sep. 19, 2019

(65) Prior Publication Data
US 2020/0408066 A1    Dec. 31, 2020

(30) Foreign Application Priority Data

Mar. 12, 2018 (EP) .................... 18161256

(51) Int. Cl.
*E21B 34/08* (2006.01)
*E21B 43/32* (2006.01)
(Continued)

(52) U.S. Cl.
CPC .............. *E21B 34/08* (2013.01); *F15D 1/025* (2013.01); *F16K 15/14* (2013.01);
(Continued)

(58) Field of Classification Search
CPC .......... E21B 34/08; E21B 43/32; E21B 43/12; E21B 7/04; F15D 1/025; F16K 15/14; F16K 31/1221; G05D 7/0133; G05D 7/012
See application file for complete search history.

(56) References Cited

U.S. PATENT DOCUMENTS

| 3,809,111 A | 5/1974 | Olsson |
| 5,435,393 A | 7/1995 | Brekke |
(Continued)

FOREIGN PATENT DOCUMENTS

| CN | 104364464 | 2/2015 |
| EP | 2669466 | 12/2013 |
(Continued)

OTHER PUBLICATIONS

EPO Opposition OP1243EP00Communicationofanoticeofoppositiondated19.01.2024-Oppositionfiled12.01.2024byTendeka Limited (Year: 2024).*
(Continued)

*Primary Examiner* — George S Gray
(74) *Attorney, Agent, or Firm* — Christian D. Abel

(57) ABSTRACT

A fluid flow control device for establishing a controllable fluid communication between an external fluid reservoir and a base pipe constituting part of a production string, as well as a production string and a method using such a fluid flow control device. The fluid flow control device comprises a primary flow path arranged inside a fluid control device housing, a secondary flow path and a movable valve element arranged at and/or within the primary flow path. The inlet of the secondary flow path is arranged separate from the inlet of the primary flow path.

15 Claims, 13 Drawing Sheets

(51) Int. Cl.
*F15D 1/02* (2006.01)
*F16K 15/14* (2006.01)
*F16K 31/122* (2006.01)
*G05D 7/01* (2006.01)

(52) U.S. Cl.
CPC ....... *F16K 31/1221* (2013.01); *G05D 7/0133* (2013.01); *E21B 43/32* (2013.01)

(56) References Cited

U.S. PATENT DOCUMENTS

| | | | |
|---|---|---|---|
| 7,819,196 | B2 | 10/2010 | Aakre |
| 7,823,645 | B2 | 11/2010 | Henriksen |
| 7,857,050 | B2 | 12/2010 | Zazovsky |
| 7,918,275 | B2 | 4/2011 | Clem |
| 9,556,706 | B1 * | 1/2017 | Zhao ............... E21B 43/14 |
| 9,683,426 | B2 | 6/2017 | Lopez |
| 10,060,221 | B1 * | 8/2018 | Rong ............... E21B 43/12 |
| 2008/0041580 | A1 | 2/2008 | Freyer |
| 2008/0041582 | A1 | 2/2008 | Saetre |
| 2009/0283275 | A1 | 11/2009 | Hammer |
| 2011/0067878 | A1 | 3/2011 | Aadnoy |
| 2011/0198097 | A1 | 8/2011 | Moen |
| 2011/0308806 | A9 | 12/2011 | Dykstra |
| 2014/0332229 | A1 | 11/2014 | Greci |
| 2015/0021019 | A1 | 1/2015 | Veit |
| 2015/0034323 | A1 | 2/2015 | Greene |
| 2015/0060084 | A1 | 3/2015 | Moen et al. |
| 2019/0055823 | A1 | 2/2019 | Koli |

FOREIGN PATENT DOCUMENTS

| | | | |
|---|---|---|---|
| WO | 2007/126496 | 11/2007 | |
| WO | 2008/004875 | 1/2008 | |
| WO | 2013/028335 | 2/2013 | |
| WO | WO-2013139601 A2 * | 9/2013 | ............ E21B 34/08 |
| WO | WO2016/033459 A1 | 3/2016 | |
| WO | 2018/142118 | 8/2018 | |

OTHER PUBLICATIONS

English translation of CN Office action and search report, filed inter alia as statement of relevance for any non-English refs cited therein.

Haavard Aakre, InflowControl/Telemark University; Britt Halvorsen, Telemark University; Barnar Werswick and Vidar Mathieson, Inflow Control (2014) "Autonomous Inflow Control Valve for Heavy and Extra-Heavy Oil", SP ••171141-MS, presented at the SPE Heavy and Extra Heavy Oil Conference • Latin America held in Medellin, Columbia, Sep. 24-26, 2014.

Igor Jovanov; "Performance of autonomous inflow control systems"; Master's Thesis, University of Stavanger; Jun. 13, 2016.

Text Book; "Fundamentals of Thermal-Fluid Sciences"; Yunus A. Qengel, John M. Cimbala, Robert H. Turner; 4" Edition; p. 540.

Faisal Turki Manee Al-Khelaiwi; "A Comprehensive Approach to the Design of Advanced Well Completions"; vol. 1; PhD Thesis, Heriot-Watt University; Mar. 2013.

Applications of Mechanical External Casing Packers; Miguel Armenta, SPE, Ali Al• Ghamdi, SPE, and Ali Al-Hajj, SPE, Saudi Aramco; SPE 105380; 2007.

The Autonomous RCP Valve - New Technology for Inflow Control In Horizontal Wells; Vidar Mathiesen, Haavard Aakre, Bjornar Werswick, Geir Elseth, Statoil Asa; SPE 145737; 2011.

OP1243EP00 Communication of a notice of opposition dated Jan. 19, 2024—Opposition filed Dec. 1, 2024 by Tendeka Limited.

* cited by examiner

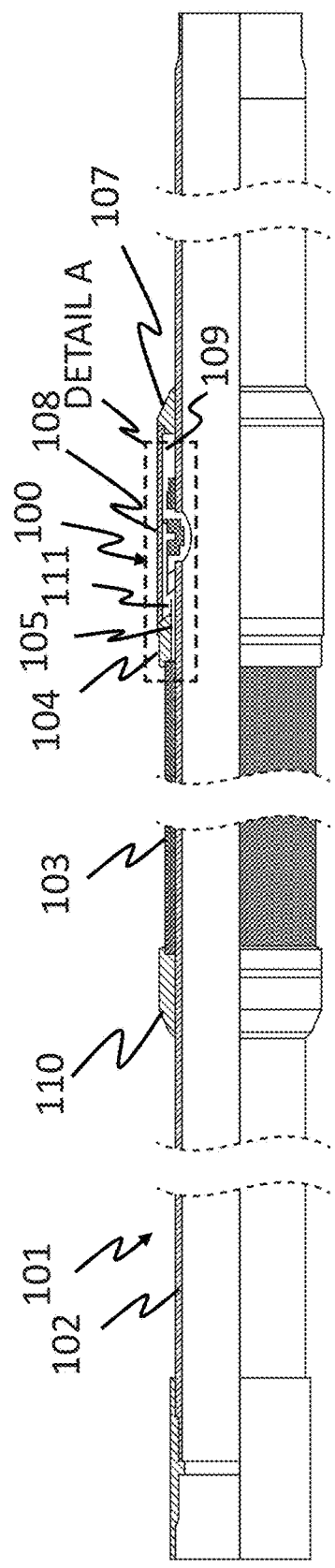
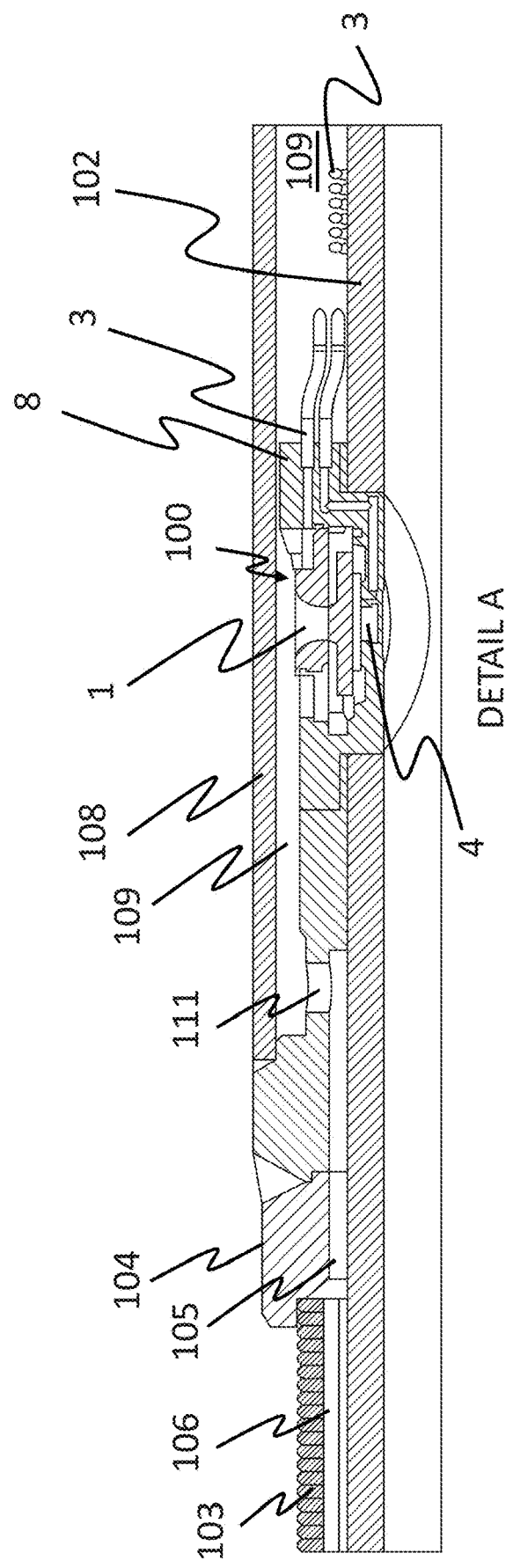
Fig. 4A
Fig. 4B

FLOW CONTROL DEVICE AND METHOD

FIELD OF THE INVENTION

The invention concerns the control of fluid flowing into a conduit. More specifically, the invention concerns a fluid flow control device, as well as a subsea production string and a method using such a fluid flow control device. The invention is useful in controlling flow of fluids from a subterranean hydrocarbon reservoir and into production strings.

BACKGROUND OF THE INVENTION

A well for producing hydrocarbons from a subterranean reservoir may extend through the reservoir in a number of orientations. Traditionally, reservoirs were accessed by drilling vertical wells. This is simple and straight-forward technique, but one which provides limited reservoir contact per well. Therefore, in order to access more of a reservoir per well, techniques and devices were developed to drill horizontal wells, i.e. turning the well from vertical to horizontal at a predetermined depth below the surface. So-called multi-lateral wells provide even greater access to—and contact with—the reservoir.

A major challenge in the production of hydrocarbons from subterranean reservoirs is to increase the ability to recover the oil that is present in the reservoir. Today, only a part of the oil in a given reservoir is actually recovered and produced before the field is shut down. There are thus strong incentives for developing new technology to increase production and oil recovery.

Two factors are of particular importance in order to increase production and rate of recovery from a reservoir:
 obtaining maximum reservoir contact and
 preventing negative effects of gas and/or water penetration/breakthrough (commonly referred to as "coning").

The reservoir contact is commonly achieved by drilling a number of horizontal and/or multi-lateral wells. The negative effects of coning are commonly mitigated by so-called Inflow Control Devices (ICD) placed in the production string wall. Typically, a production string in a horizontal well comprises a large number of ICDs disposed at regular intervals along its entire length. The ICDs serve as inflow ports for the oil flowing from the reservoir (normally via the annulus between the production string and the well formation) and into the production string, and are ports having a fixed flow area.

So-called autonomous ICDs (AICDs) comprise one or more valve elements and are normally open when oil is flowing through the device, but chokes the flow when and where water and/or gas enters the device. The annulus between the production string and the casing is typically divided into zones by annulus packers, which is known in the art. One or more ICDs or AICDs are then placed in each zone.

A number of ICDs are known in the art. Relevant examples of ICDs or AICDs are found in patent publications U.S. Pat. No. 5,435,393 (Brekke, et al.), U.S. Pat. No. 7,857,050 B2 (Zazovsky, et al.), U.S. Pat. No. 7,823,645 B2 (Henriksen, et al.), US 2008/0041580 A1 (Freyer, et al.), WO 2008/004875 A1 (Aakre, et al.), US 2011/0067878 A1 (Aadnoy), US 2008/0041582 A1 (Saetre, et al.), US 2011/0198097 A1 (Moen), US 2011/0308806 A9 (Dykstra, et al.), U.S. Pat. No. 7,918,275 B2 (Baker Hughes Inc), US 2009/0283275 A1 (Baker Hughes Inc), U.S. Pat. No. 7,819,196 B2 (Norsk Hydro ASA) and U.S. Pat. No. 9,556,706 B1 (Floway Inc.). The latter publication discloses an AICD that allows control of the inflow of production fluids from multiple production intervals without the need of i.a. biasing devices.

The above-mentioned patent publications suffer from one or more of the following disadvantages:
 The production is choked also for the oil, which may result in a significant loss of production (barrel/day) during the initial phase of the well's lifetime.
 Undesired phases (gas/water) are neither choked nor closed at the moment of their breakthroughs.
 Undesired phases (gas/water) are to a certain degree choke, though not to the extend of coming to a full, or close to full, halt in the inflow.
 Reversible property is not exhibited, that is, the ability to autonomically reopen a valve that has been shut due to entrance of undesired phases at the moment when oil again starts to flow into the well.
 Challenging to control the opening/closing.
 High flow resistance within the main flow during throughput of desired phases.
 Not able to manage harsh well conditions (high pressure and temperature, fouling, etc.) in a satisfactory way.

A prior art AICD that overcome all of the above-mentioned disadvantages is disclosed in patent publication WO 2013/139601 A2, the contents of which are incorporated herein by reference. The prior art AICD comprises a primary flow path and a secondary flow path arranged in fluid communication with the primary flow path. The secondary flow path further comprises two fluid flow restrictors serving as an inflow port and an outflow port from a chamber, respectively. The two flow restrictors are configured to generate different fluid flow characteristics.

There are however some disadvantages with the AICD disclosed in WO 2013/139601 A2. The secondary flow path is in fluid communication with the primary flow path. Such a configuration necessitates allocation of additional space within the housing, resulting in a longer axial length of the AICD. The configuration also makes it difficult to arrange filters at the fluid inlet to prevent plugging during operation. Such plugging is a well-known problem in the field. To generate laminar flow by inserting fluid flow restrictor such as a porous material also necessitate a complex design with little or no possibilities of adaptations to varying fluid viscosities. In addition, porous materials have typically small openings, thereby creating a high risk of plugging due to fines (small particles).

The purpose of the present invention is to overcome the shortcomings of the above mentioned prior art and to obtain further advantages.

SUMMARY OF THE INVENTION

The invention is set forth and characterized in the main claims, while the dependent claims describe other characteristics of the invention.

It is thus provided a fluid flow control device suitable for establishing a controllable fluid communication of a fluid flow (F) between an external fluid reservoir and a base pipe constituting part of a production string.

The fluid flow control device comprises a primary flow path arranged inside a fluid control device housing. The primary flow path comprises a primary flow path inlet configured to guide a primary fluid flow ($F_0$) constituting part of the fluid flow (F) at least partly axial into the fluid control device housing from the external fluid reservoir during operation and a primary flow path outlet configured to guide the primary fluid flow ($F_O$) into the base pipe during operation.

The fluid flow control device further includes a secondary flow path and a movable valve element arranged inside the fluid control device housing, at and/or within the primary flow path.

The secondary flow path comprises at least one first fluid flow restrictor configured to generate a pressure decrease from a pressure $p_1$ upstream of the first fluid flow restrictor to a pressure $p_2$ downstream of the first fluid flow restrictor, at least one second fluid flow restrictor arranged downstream of the first fluid flow restrictor and configured to generate a pressure decrease from the pressure $p_2$ upstream of the second fluid flow restrictor to a pressure $p_3$ downstream of the second fluid flow restrictor and a chamber (B) arranged downstream the first fluid flow restrictor and upstream the second fluid flow restrictor.

The movable valve element is configured to at least partly, preferably fully close the primary flow path for primary fluid flow ($F_O$) when exposed to a pressure force from within the chamber (B) exceeding a threshold pressure force.

The secondary flow path further comprises a secondary flow path inlet arranged within the fluid control device housing having preferably a radial offset to the primary flow path at its entrance into the housing. The secondary flow path inlet is thus configured to guide a secondary fluid flow (f) constituting a remaining part of the fluid flow (F) from the fluid reservoir into the fluid control device housing.

If the secondary flow path is radially offset from the primary flow path at the entrance of the fluid control device housing, the fluid flow (F) from the external fluid reservoir is during operation divided into the primary fluid flow ($F_O$) entering the housing via the first fluid path and the secondary fluid flow (f) entering the housing via the secondary fluid path.

When the fluid flow (F) consists of the primary fluid flow ($F_O$) and the secondary fluid flow (f) only, the primary fluid flow ($F_O$) constitutes a major portion of the fluid flow (F) per unit time, for example more than 90% or more than 95%.

Axial and radial direction is herein defined as the direction perpendicular and parallel to the longitudinal direction of the base pipe, respectively, i.e. the principal direction of fluid flow within the base pipe.

In an advantageous example, the secondary flow path inlet is oriented such that the secondary fluid flow (f) flows axially or near axially into the fluid control device housing during operation. Near axially signifies that there may be a deviation from axial, for example a deviation of maximum 20 degrees from the axial axis.

In another advantageous example, the first fluid flow restrictor is configured to generate either a laminar, or near laminar, fluid flow characteristic or a turbulent, or near turbulent, fluid flow characteristic, while the second fluid flow restrictor are configured to generate either a turbulent fluid flow characteristic or a laminar fluid flow characteristic being different from the fluid flow characteristic generated by the first fluid flow restrictor. Laminar flow is herein defined as a fluid flowing in parallel layers, with no or insignificant disruption between the layers. Further, turbulent flow is herein defined as a fluid that undergoes irregular fluctuations, or mixing, i.e. where the speed of the fluid at a point is continuously undergoing changes in both magnitude and direction.

In yet another advantageous example, the flow control device further comprises an inlet bushing arranged axially within the flow control device housing for guiding the primary fluid flow ($F_O$) therethrough during operation and a first ring-shaped disc arranged axially beneath the secondary flow path inlet with its centered opening around the inlet bushing. The inlet bushing and the first ring-shaped disc may be separate or form an integrate part.

The first ring-shaped disc may comprise an axial, or near axial, first locking edge running along the circumference of the inner center opening of the first ring-shaped disc.

The disc may preferably also comprise an axial, or near axial, directed second locking edge along the outer circumference of the first ring-shaped disc having at least one opening configured to guide the secondary fluid flow (f) flowing through the secondary flow path inlet into the fluid flow restrictor during operation.

In order to ensure no or insignificant leakage between the primary flow path and the secondary flow path, one or more bushing seals are arranged between the inlet bushing and the first ring-shaped disc.

The term 'beneath' signifies here an axial position relative to components of the fluid flow control device located at or near the inlet of the primary and secondary fluid flows ($F_O$,f), e.g. an inlet bushing and/or an inlet filter.

In yet another advantageous example, the fluid flow control device further comprises a filter arranged across the secondary flow path inlet for preventing, or at least significantly reducing, solid state particles within the fluid flow (F) from entering the secondary flow path, while at the same time allowing the primary fluid flow ($F_O$) to flow unfiltered through the primary flow path inlet during operation. This particular configuration has the additional advantage that the filter becomes self-cleansing due to the fact that the primary flow is flowing transversely to the filter before entrance into the housing. The filter may comprise at least one outer protrusions protruding radially outward from the outer circumference of the filter and at least one inner protrusion protruding radially inward from the inner circumference of the filter. These filter protrusions ensure a locking effect to the housing and the first ring-shaped disc, respectively.

In yet another advantageous example, the first or the second fluid flow restrictor comprises a pipe of length L and a mean hydraulic diameter $<D_L>$ averaged across the length L, wherein the length (L) and the mean hydraulic diameter ($<D_L>$) are chosen to achieve a laminar flow characteristic flowing out of the one of the first and second fluid flow restrictors. For example, the length (L) and the mean hydraulic diameter ($<D_L>$) are chosen to achieve a ratio between the length L and the mean hydraulic diameter $<D_L>$, i.e. $L/<D_L>$, that results in a Reynold number of the fluid flow (RE) being equal or less than 4000, preferably less than 3500, more preferably less than 3000 and even more preferably less than 2500.

The Reynold number is defined as $$RE = \langle D_L \rangle \left( \frac{Q}{\langle A_L \rangle} \cdot \frac{\rho}{\mu} \right)$$

where
  Q is as the volumetric flow rate Q (m³/s),
  $<A_L>$ is the mean cross-sectional wetted area across the length L (m/s),
  $<D_L>$ is the mean hydraulic diameter across the length L (m)
  ρ is the density of the fluid flow rate (kg/m³) and
  μ is the dynamic fluid viscosity (kg/m·s).

In yet another advantageous example, the first fluid flow restrictor comprises an interior outlet channel located inside the fluid control device housing being in fluid communication with the secondary flow path inlet, an exterior pipe of length L* located outside the fluid control device housing being in fluid communication with the interior outlet channel and an interior return channel located inside the fluid control device housing being in fluid communication with the exterior pipe. A section of the exterior pipe may be coiled, for example a multiple time around the base pipe of the production string.

In yet another advantageous example, the secondary flow path comprises a secondary flow path outlet. Furthermore, more than 70% of the length of the secondary flow path from the secondary flow path inlet and the secondary flow path outlet may be located outside the fluid control device housing, more preferably more than 80% of the length and even more preferably more than 90% of the length. In an alternative or additional configuration, both the secondary flow path outlet(s) and the second flow restrictor(s) are arranged outside the housing, while being in fluid communication with the pressure P2 within the chamber B of the housing. In this alternative or additional configuration, the flow out of the second flow restrictor(s) would then enter into the base pipe at pressure P3.

In yet another advantageous example, the movable valve element comprises a lower disc having a disc surface facing towards the chamber B and an upper disc arranged with one disc surface facing towards the lower disc and the other disc surface facing toward the primary flow path inlet. The disc diameter of the upper disc may be smaller than the disc diameter of the lower disc. Furthermore, the axial transition between the lower disc and the upper disc may be smooth to avoid excessive fluid flow resistance of the primary fluid flow ($F_o$) due to flow across sharp edges, pointed protrusions, etc. The disc diameter of the upper disc may preferably be at least equal to the minimum radial opening size of the primary flow path inlet. Furthermore, the section of the lower disc between the upper disc and the outer circumference of the lower disc may be flat relative to the radial direction of the fluid control device housing. In addition to further ensure non-interrupted primary fluid flow, the flat configuration also contribute to minimize the axial extent ($t_{AICD}$) of the fluid control device housing.

In yet another advantageous example, the fluid flow control device further comprises a second ring-shaped disc arranged with its centered opening around the outer circumference of the movable valve element.

The second ring-shaped disc may comprise an axial directed protrusion extending along the outer circumference of the second ring-shaped disc and configured to create a fixed axial distance between the radially extending surface of the second ring-shaped facing towards the primary flow path inlet and an inner wall of the fluid control device housing. The axial directed protrusion creates at least one opening configured to guide the primary fluid flow ($F_o$) flowing through the primary flow path inlet from the movable valve element towards the primary flow path outlet.

In yet another advantageous example, the fluid flow control device further comprises a resilient member arranged axially beneath the surface of the movable valve element facing away from the primary flow path inlet. A part of the resilient member is preferably fixed to the interior walls of the fluid control device housing such that the movable valve element is an axial position when not exposure to a pressure force within the chamber B that ensures fluid flow between the primary flow path inlet and the primary flow path outlet.

In yet another advantageous example, the first fluid flow restrictor comprises a multi-inlet pipe arranged in fluid communication downstream of the secondary flow path inlet, wherein the multi-inlet pipe displays at least two radially spaced apart inlets, for example having a first and second inlet arranged diagonally to each other across the primary flow path inlet. The shape of the multi-inlet pipe may as an example be an arc partly surrounding the primary flow path inlet.

In yet another advantageous example, the first fluid flow restrictor comprises a multi-inlet pipe arranged with the fluid control device housing and in fluid communication with the secondary flow path inlet, an interior outlet channel arranged inside the fluid control device housing and in fluid communication with the multi-inlet pipe, an exterior pipe of length L* arranged at least partly outside the fluid control device housing and in fluid communication with the interior outlet channel and an interior return channel located inside the fluid control device housing and in fluid communication with the exterior pipe. The multi-inlet pipe displays at least two radially spaced apart inlets, for example arranged diagonally, or near diagonally, around the primary flow path inlet. A section of the exterior pipe may be coiled in order to achieve a long first fluid flow restrictor occupying a minimum amount of space.

The invention also concerns a production string suitable for transport of hydrocarbons. The production string comprises base pipe, an enclosure arranged at the exterior wall of the base pipe having at least one enclosure input opening and a fluid flow control device in accordance with any of the above-mentioned features.

The fluid flow control device is arranged into a through-going hole of the wall of the base pipe, and within the enclosure, such that a controllable fluid communication is obtained between the enclosure and the interior of the base pipe. In a preferred configuration the fluid communication takes place through one primary flow path inlet and into the base pipe via a plurality of primary flow path outlets.

Furthermore, the enclosure is configured to provide an input chamber covering the at least one enclosure input opening of the enclosure as well as the primary flow path inlet and the secondary flow path inlet of the fluid flow control device.

In an advantageous embodiment, the first or the second fluid flow restrictors includes a pipe of length L and a mean hydraulic diameter $<D_L>$ averaged across the length L, for example a pipe with a constant diameter D. Preferably, at least a part of the pipe is coiled at least 50% around the outer circumference of the base pipe, more preferably at least 80% around the outer circumference, even more preferably at least one time around the entire circumference, and even more preferably at least twice around the entire circumference.

Finally, the invention concerns a method of controlling fluid flow (F) based on changes in fluid properties. The method uses a fluid flow control device in accordance with any one of the above-mentioned features and comprises the steps:
guiding the primary fluid flow ($F_o$) constituting a major portion of the fluid flow (F) through the primary flow path within the fluid control device housing; and
guiding the secondary fluid flow (f) through the secondary flow path, wherein the secondary fluid flow (f) constitutes a minor portion of the fluid flow (F) when the fluid flow control device is in an open position, that is, a position of the valve element relative to the housing that allows flow communication between the primary flow path inlet(s) and the primary flow path outlet(s). A minor portion may typically be less than 10% of the primary fluid flow ($F_O$) when the device is in a fully open position, even more typically less than 5%.

A major portion of the length of the secondary flow path may preferably extend outside the fluid control device housing.

The inventive flow control device stops unwanted fluids (e.g. water, gas, steam and $CO_2$) from entering production flow of a desired fluid (e.g. oil) while being robust, compact and fully autonomous. It is reversible in the sense that the valve device changes position as the properties (e.g. viscosity) of the fluid changes. That is, where for example the flow control device closes when the viscosity decreases (i.e. exposed to water or gas), it opens again when the viscosity increases (i.e. exposed to oil).

There is a significant economical gain in preventing choking of the initial oil production (present value) and increasing the degree of production due to efficient closure of undesired fluid phases such as water and/or gas. The estimated increase in the production and recovery from a well, which will be a function of the reservoir and fluid properties, will be at least 10%. The production cost of the inventive valve is close to insignificant compared to the potential gain due to increased oil production.

Moreover, the slim/compact design of the inventive flow control device avoids excessive protrusion into or out of the base pipe of the production string. This is a significant advantage over all the known AICDs described above.

A flow control device protruding far out from the base pipe would make it difficult for oil and gas companies to use standard base pipes and bores used today. And due to both costs and technical challenges any changes in well proven design is normally undesirable. For example, a larger bore would result in increased cost and a bore with smaller diameter would result in increased pressure loss in the base pipe (well).

Likewise, protrusion into the base pipe should be avoided or reduced. One problem with protrusions into the base pipe is related to the fact that measurements or well intervention must be performed where smaller pipes/equipment are guided into base pipes/liners. Any protrusions such as protruding flow control devices makes such operations difficult or even impossible.

BRIEF DESCRIPTION OF THE DRAWINGS

These and other characteristics of the invention will be clear from the following description of embodiments, given as non-restrictive examples, with reference to the attached sectional sketches and drawings wherein:

FIGS. 4A and B show a flow control device in accordance with the invention, installed in a production string, where FIG. 4A illustrates the interplay between the production string and the flow control device and FIG. 4B illustrates the installed flow control device in greater details;

FIG. 11A shows a cross sectional view of the fluid control device with prevailing forces and pressures during operation, FIG. 11B shows a plot of the net closing and opening forces as a function of pressure difference across the piston of the flow control device and FIG. 11C shows a plot of the ratio between the pressure difference across the first fluid flow restrictor and across the second fluid flow restrictor within the secondary flow path.

DETAILED DESCRIPTION OF EMBODIMENTS

Figure 1:
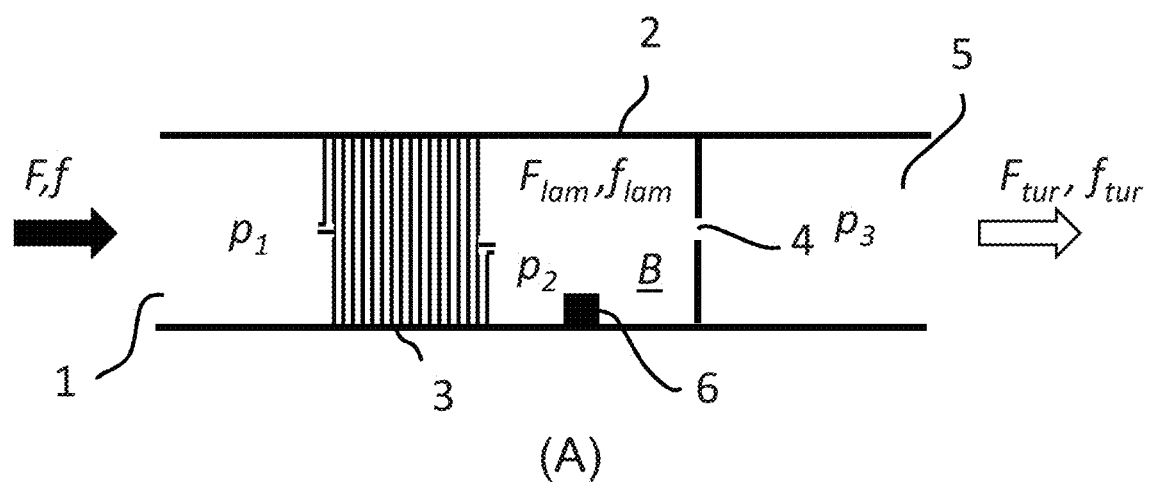
FIG. 1 shows the principle behind the invention.

FIG. 1 illustrates how a fluid F,f flows through a fluid flow inlet 1 into a conduit 2 at a first pressure $p_1$, further through a first fluid flow restrictor 3 and into a chamber B where it attains a second pressure $p_2$, and then flows through a second fluid flow restrictor 4 before it exits the conduit 2 through a fluid flow outlet 5 at a third pressure $p_3$. When the fluid flow rate and fluid properties (e.g. viscosity, density) are kept constant, the pressures ($p_1$, $p_2$, $p_3$) are also constant, and $p_1$, $>p_2$, $>p_3$.

In FIG. 1, the first fluid flow restrictor 3 is a coiled pipe and the second fluid flow restrictor 4 is an orifice. The coiled pipe may have any cross-sectional shape such as circular shape, rectangular shape, triangular shape, etc.

In general, the pressure loss due to viscous effect in a cylindrical pipe of length L and uniform diameter D is proportional to length L and can be characterized by the Darcy-Weisbach equation expressed as:

$$\Delta P = \frac{f_D \cdot \rho \cdot \langle v \rangle^2}{2} \cdot \frac{L}{D_L} \quad \text{(Equation 1)}$$

where: $\rho$=the density of the fluid flow rate (kg/m³)

$D_L$=the hydraulic diameter of the pipe (for a pipe of circular section, this equals the internal diameter of the pipe (m));

$\langle v \rangle$=the mean flow velocity, experimentally measured as the volumetric flow rate Q per unit cross-sectional wetted area (m/s);

$f_D$=the Darcy friction factor (also called flow coefficient $\lambda$);

L=the length of the cylindrical pipe (m).

Hence, according to the Darcy-Weisbach equation (Equation 1) a large ratio L/D corresponds to a large pressure drop $\Delta P$ (from $p_1$ to $p_2$ in FIG. 1A) when a fluid F,f is flowing through the conduit 2.

In the laminar regime, Equation 1 may be rewritten as $$\Delta P = \frac{128 \cdot Q}{\pi} \cdot \mu \cdot \frac{L}{D^4} \quad \text{(Equation 2)}$$

Thus, under laminar flow conditions or near laminar flow conditions, the change in pressure (ΔP) across the coiled pipe is seen to be proportional to the fluid viscosity (μ), as well as the ratio $L/D^4$.

Laminar flow is achieved with a Reynolds number (RE) being less than 4000. Since RE=<v>·D·ρ/μ for flow of fluid in a pipe of diameter D, such laminar flow may be ensured by adjusting e.g. the diameter D and/or the flow velocity <v>. From equation 2 it is clear that if ΔP is constant, Q (volumetric flow rate) would decrease with increasing pipe length (L), and as a result also a decrease in velocity <v>. A coiled pipe with a sufficient pipe length (L) would therefore have formed a laminar flow or near laminar flow.

The flow characteristics in a fluid flowing through an orifice may be expressed as:

$$\Delta P = K_{orifice} \frac{\rho \cdot v^2}{2} \quad \text{(Equation 3)}$$

where: ΔP=differential fluid pressure across the orifice (typical unit: Pa)

$K_{orifice}$=orifice-specific coefficient (dimensionless)
ρ=fluid density (unit of mass per unit of volume)
v=fluid velocity (units of length per unit time)

Thus, when flowing through the orifice 4, the fluid experiences a pressure drop (ΔP) (from $p_2$ to $p_3$) described by equation 3. The change in fluid pressure across the orifice 4 is almost independent of viscosity, but proportional to the density and the orifice coefficient, as well as to the fluid velocity squared.

Figure 2:
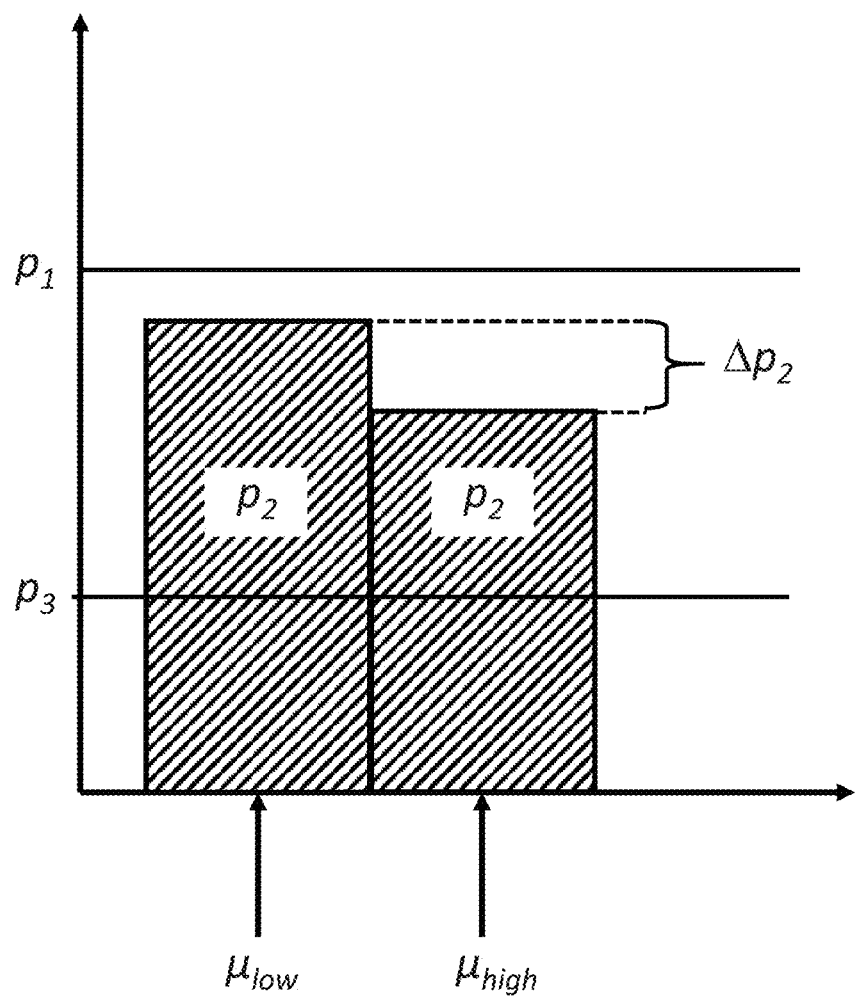
FIG. 2 shows the correlation between change in pressure inside the chamber (i.e. between fluid flow restrictors), and the change in fluid viscosity.

Therefore, with reference to FIG. 1, the fluid pressure $p_2$ in the chamber B, i.e. between the coiled pipe 3 and the orifice 4, will change if the properties (viscosity or density) of the fluid changes. This is illustrated graphically in FIG. 2. A first (low) value for $p_2$ is formed with a flow of fluid having a high fluid viscosity ($\mu_{high}$) and a second ($\mu_{high}$) value for $p_2$ is formed with a flow of fluid having a low fluid viscosity ($\mu_{low}$). The difference between the values for $p_2$ (Δ$P_2$) occurring when the fluid properties changes (e.g. a decrease in viscosity) may be used to perform work, for example actuate an actuator 6, which in turn may move a piston 9 acting as a valve element 9, possibly via hydraulic and/or electrical and/or mechanical transmission means 10 (see FIG. 3).

In general, the present invention utilizes the change in pressure (Δ$P_2$) that occurs between two different flow restrictors when subjected to fluids of different properties, e.g. oil and water. These properties may for example be viscosity, density or both.

Figure 3A:
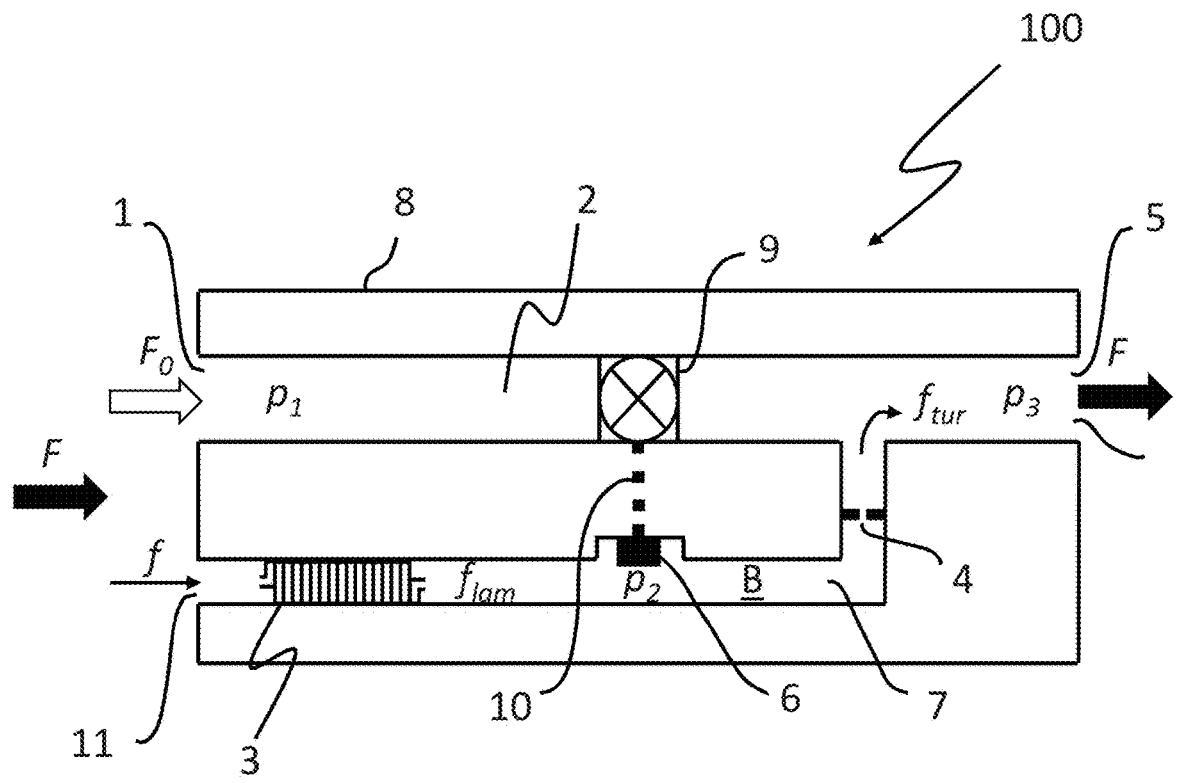
FIGS. 3A and B show schematically two different embodiments of the invention, where FIG. 3A has a single fluid flow output and FIG. 3B has two fluid flow outputs.
Figure 3B:
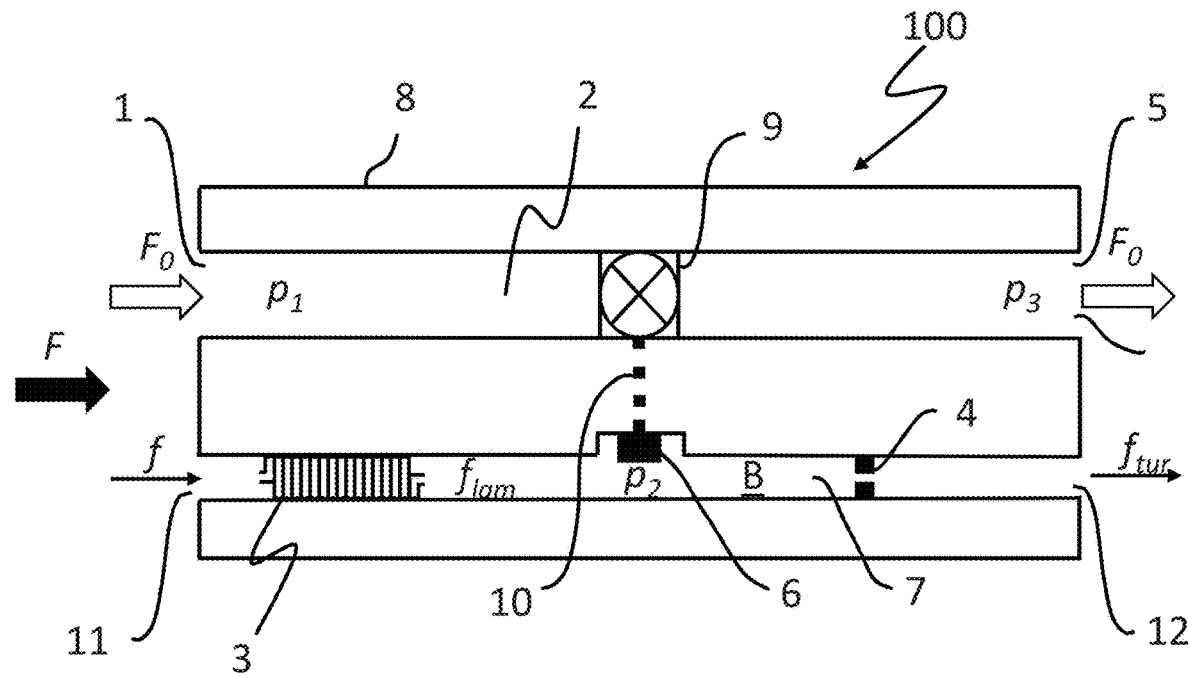

FIGS. 3A and 3B are schematics illustrating two embodiments of the principle described above. FIG. 3A illustrates a first embodiment of the inventive flow control device 100 in its basic form (i.e. where seals, gaskets and other required or recommended ancillary parts known in the art are omitted). A fluid flow (F) enters a fluid control device housing 8 via two fluid paths 2,7; a primary flow path (primary conduit) 2 having a primary flow path inlet 1 and a secondary flow path (secondary conduit) 7 having a secondary flow path inlet 11. The major portion ($F_O$) of the fluid flow (F), hereinafter referred to as the primary fluid flow, flows through the primary conduit 2 and an initially open valve element 9. A smaller portion (f) of the fluid flow (F), for example 5% of the primary fluid flow ($F_O$), also referred to as the secondary fluid flow (f), flows the secondary conduit 7 which includes a first fluid flow restrictor 3 in the form of a coiled, thin tube of length L and diameter D and a second fluid flow restrictor 4 in the form of an orifice, before it enters the primary conduit 2 and exits out of this conduit 2 via a fluid flow outlet 5.

When the viscosity (μ) of the fluid flow (F) changes, the second pressure $p_2$ in a chamber B located in the secondary conduit 7 between the two fluid restrictors 3,4 also changes. For example, if a flow of oil is replaced by water or gas, the viscosity decreases and the second pressure $p_2$ increases as explained above with reference to FIGS. 1 and 2.

FIG. 3A furthermore shows (schematically) an actuator 6 arranged within, or coupled to, the chamber B. The actuator 6 is connected via transmission means 10 (e.g. via a hydraulic linkage, a mechanical linkage and/or a signal cable) to the piston/valve element 9. The actuator 10 can be of any form that enable actuation of the piston/valve element 9, e.g. the surface of a valve piston being exposed to the force generated by the induced pressure Δ$P_2$ such as the surface facing the chamber B.

When the fluid viscosity (μ) changes as described above, the difference in values for $p_2$ (Δ$P_2$, see FIG. 1) imparts an actuating force on the actuator 6, which in turn operates (e.g. closes) the piston/valve element 9. Thus, the conduits 2,7 and the fluid flow restrictors 3,4 may be configured and dimensioned such that (when breakthrough is to be prevented) the piston/valve element 9 automatically closes when the viscosity (μ) of the fluid (F) drops below a predetermined level. As an example, in an oilfield application, this device 100 prevents unwanted water and/or gas inflow into a production string 101 (see FIG. 4).

FIG. 3B shows schematically a second embodiment of the invented flow control device 100. The second embodiment is identical to the first embodiment with the exception that the secondary flow path 7 is not in fluid communication with the primary flow path 2. Instead, both enters and exits the housing 8 via separate flow paths. The primary fluid flow ($F_O$) enters the primary flow path 2 from inlet 1 and exits through primary flow path outlet 5, while the secondary fluid flow (f) enters the secondary flow path 7 from inlet 11 and exits through a separate secondary flow path outlet 12. The operational principle is however the same as for the first embodiment, i.e. to create a pressure difference Δ$P_2$ between two fluid flow restrictors 3,4 arranged at least partly within the secondary flow path 7 and to use the force created by this induced pressure difference to close the primary fluid flow $F_O$ flowing through the primary flow path 2 by the aid of a piston/valve element 9.

FIGS. 4A and 4B show cross sectional drawings of a complete flow control device 100 in accordance with the invention. FIG. 4A shows the flow control device 100 mounted into a production string 101 and FIG. 4B shows in further detail the area of the production string 101 framed into a dashed rectangle (detail A).

In addition to the flow control device 100, the production string 101 further comprises a base pipe 102 into which the flow control device 100 is installed, a sand screen 103 surrounding the base pipe 102 in order to prevent large solid particles such as grains of sand or debris to enter the base pipe 102, an outer sleeve 110 fixing one axial end of the sand screen 103 to the base pipe 102, a first inner sleeve 104 configured to fix both the other axial end of the sand screen 103 onto the base pipe 102 and to establish an inner sleeve fluid channel 105 from a sand screen fluid channel 106 oriented through or below the sand screen 103 and to the fluid path inputs 1,11 of the flow control device 100.

The production string 101 further comprises a second inner sleeve 107 arranged on the base pipe 102 at the opposite radial side of the flow control device 100 relative to the first inner sleeve 104 and an end cap 108 sealing, or near sealing, the installed flow control device 100 from the exterior of the production string 101, thereby creating a closed input chamber 109 set up by the first and second inner sleeves 104,107, the end cap 108 and the base pipe 102.

In operation, fluid (F) is flowing through the sand screen 103 into the sand screen fluid channel 106, further along the inner sleeve fluid channel 105, into the closed input chamber 109 via an inner sleeve opening 111 and finally through the flow control device 100 into the base pipe 102.

As is apparent from FIG. 4, the space available for the flow control device 100 in a typical production string 101 is small. It is considered advantageous that the housing 8 of the flow control device 100 has an axial thickness (i.e. the thickness perpendicular to the axial/longitudinal direction of the base pipe 102 when installed) that is as small as technically feasible in order to avoid or minimize protrusion from the external walls of the base pipe 102 and/or into the interior of the base pipe 102.

Protrusion into the base pipe 102 should in particular be avoided since this could interfere with measurements and/or maintenance and/or repair work within the base pipe 102 that may be required/recommended throughout the operational life time of the production string 101. Such operations often involve insertions of various equipment into the base pipe 102.

As explained above, to ensure a large pressure difference across the first fluid flow restrictor 3 the ratio $L/D^4$ should be large. Further, laminar flow may be obtained by generating a flow having a Reynold number less than 4000, preferably less than 2500. This can be achieved by making the length (L) of the pipe constituting the first fluid flow restrictor 3 large enough.

Figure 5:
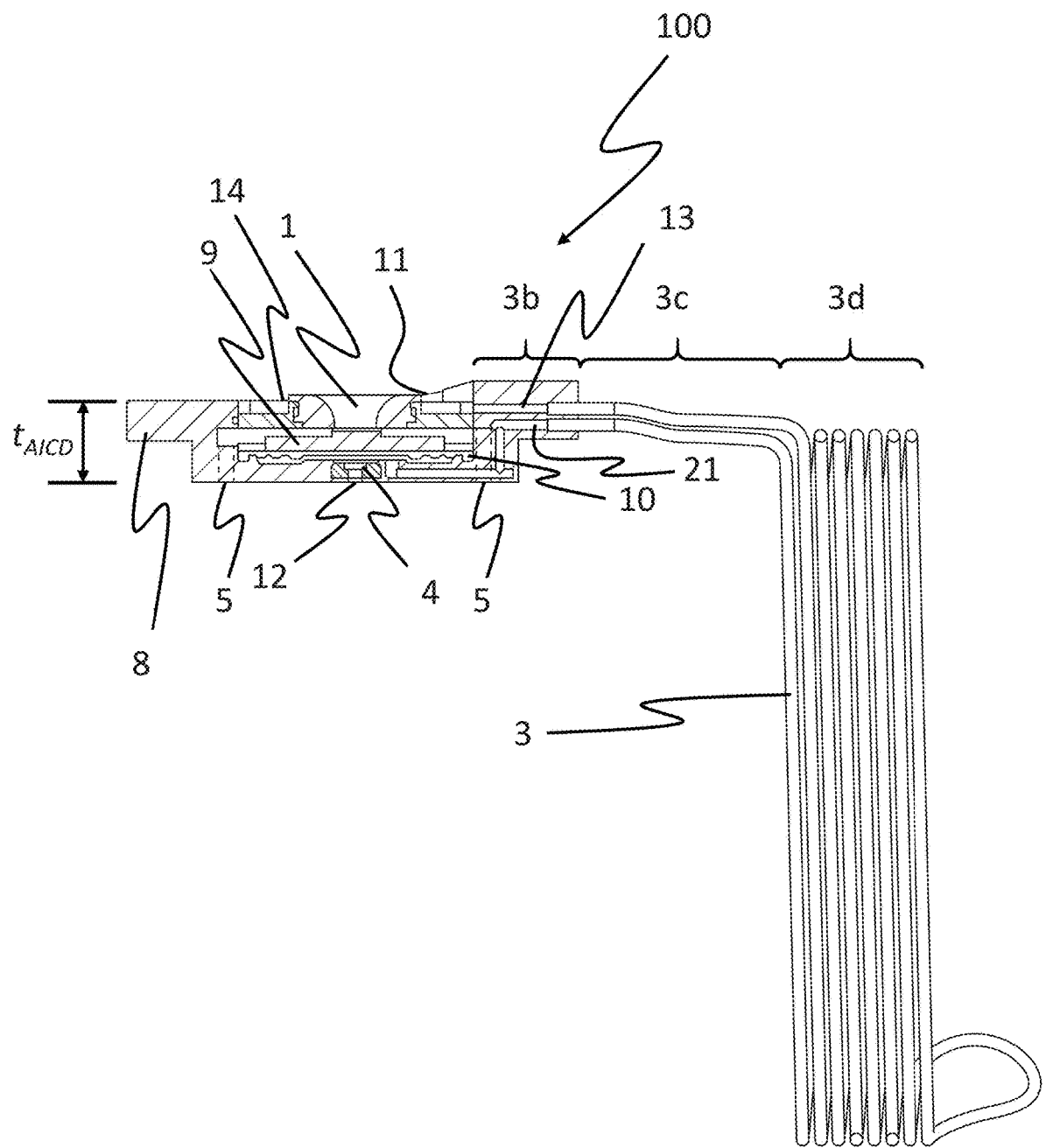
FIG. 5 shows a flow control device in accordance with the invention, illustrating the length of the coiled pipe acting as a fluid flow restrictor relative to the size of the housing of the flow control device.

FIG. 5 shows a configuration where the flow control device 100 comprises a coiled pipe acting as a laminar flow generating first fluid flow restrictor 3 arranged within the secondary conduit 7. To ensure laminar flow of the secondary fluid flow (f) flowing through the secondary conduit 7 ($f_{lam}$), and with large pressure difference ($p_1$-$p_2$), the coiled pipe 3 is made significantly longer than the axial thickness ($t_{AICD}$) of the flow control device housing 8.

The first fluid flow restrictor 3 may be divided into an interior part 3b located inside the housing 8, an exterior straight part 3c located outside the housing 8 and in fluid communication with the interior part 3b and an exterior coiled part 3d located outside the housing 8 and in fluid communication with the exterior straight part 3c. The exterior coiled part 3d is preferably coiled around the base pipe 102 a multiple time to minimize the required spatial use in direction radially to the base pipe 102 (i.e. perpendicular to its longitudinal direction), thereby minimizing the size interference of the inventive flow control device 100 with existing production lines 101. At the same time, desired large pressure differences and laminar flow may be achieved.

The ratio between the length of the pipe (L) and the axial thickness ($t_{AICD}$) of the flow control device housing 8 is preferably higher than 50, more preferably higher than 100, even more preferably higher than 200, even more preferably higher than 300. In a typical installation, the length of the pipe is 5 meters and the axial thickness is 14 millimeters.

Figure 6:
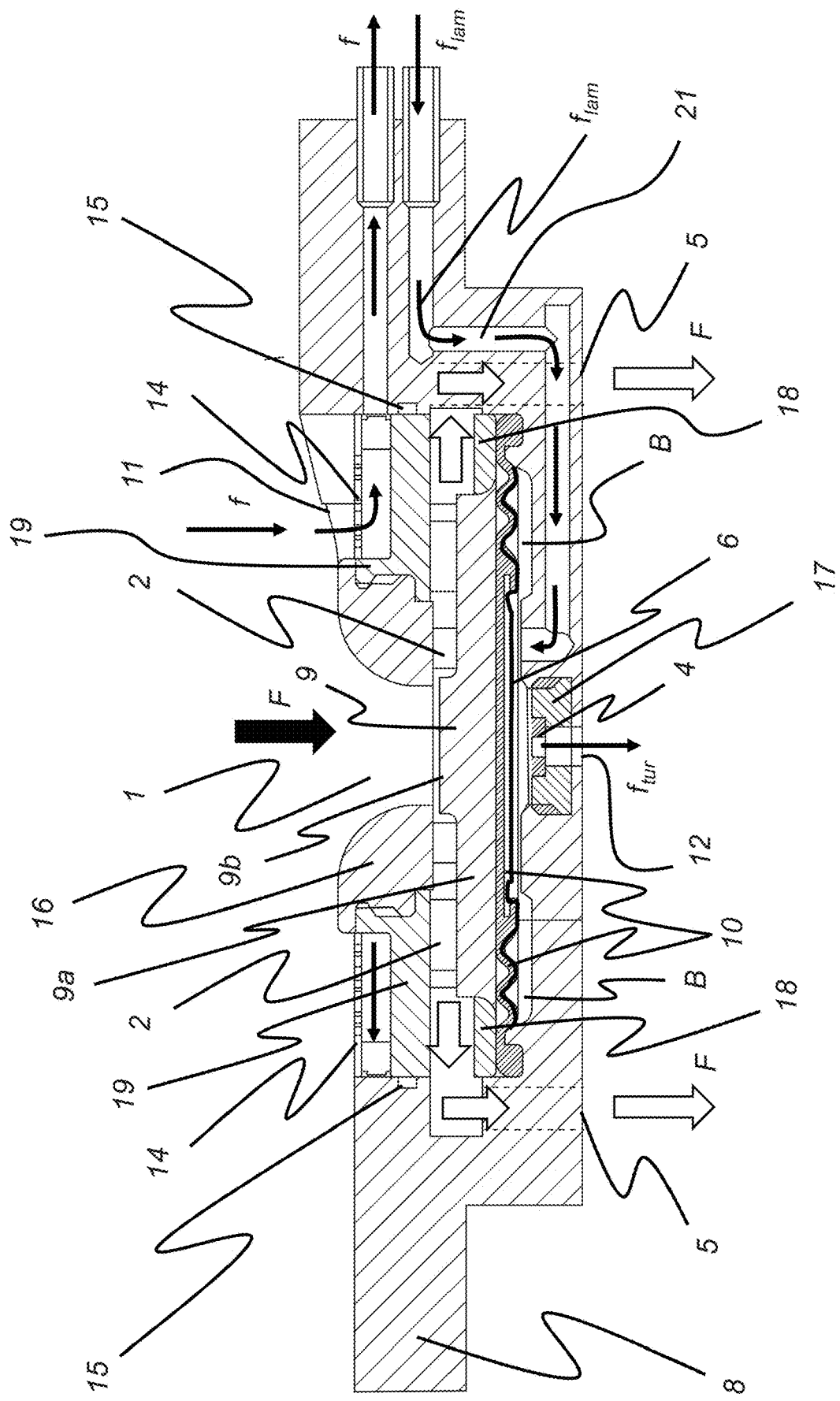
FIG. 6 shows in greater detail the housing of the flow control device of FIG. 5.

FIG. 6 shows a section of the flow control device 100 which includes only the parts situated within or near the flow control device housing 8. The housing 8, which in operation is arranged within the wall of the base pipe 102 as exemplified in FIG. 4, displays inlets 1,11 in fluid communication with the closed chamber 109 and outlets 5,12 in fluid communication with the inside of the base pipe 102 of the production string 101.

A valve element 9 in the form of an axially movable piston/disc 9 is arranged inside the housing 8. The valve element 9 is in FIG. 6 placed within a teethed primary fluid flow bushing 18, the latter providing lateral support to the piston 9 (see FIG. 7) while allowing axial piston movements. Lateral support signifies no or little movements of the piston 9 in the radial direction, i.e. parallel to the longitudinal axis of the base pipe 102 at the installation point.

Furthermore, the surface of the piston/valve element/movable disc 9 facing away from the inlets 1,11 is in the embodiment shown in FIG. 6 contacting a resilient member 10 fixed at its outer circumference to the adjacent inside wall(s) of the housing 8. The resilient member 10 transmits induced pressure force to the piston 9 and ensures that the flow control device 100 is in an initial predetermined position prior to any flow (F), for example in a fully open position or a fully closed position. The resilient member 10, for example a diaphragm, may be a semi-flexible material such as an elastomer.

Figure 7:
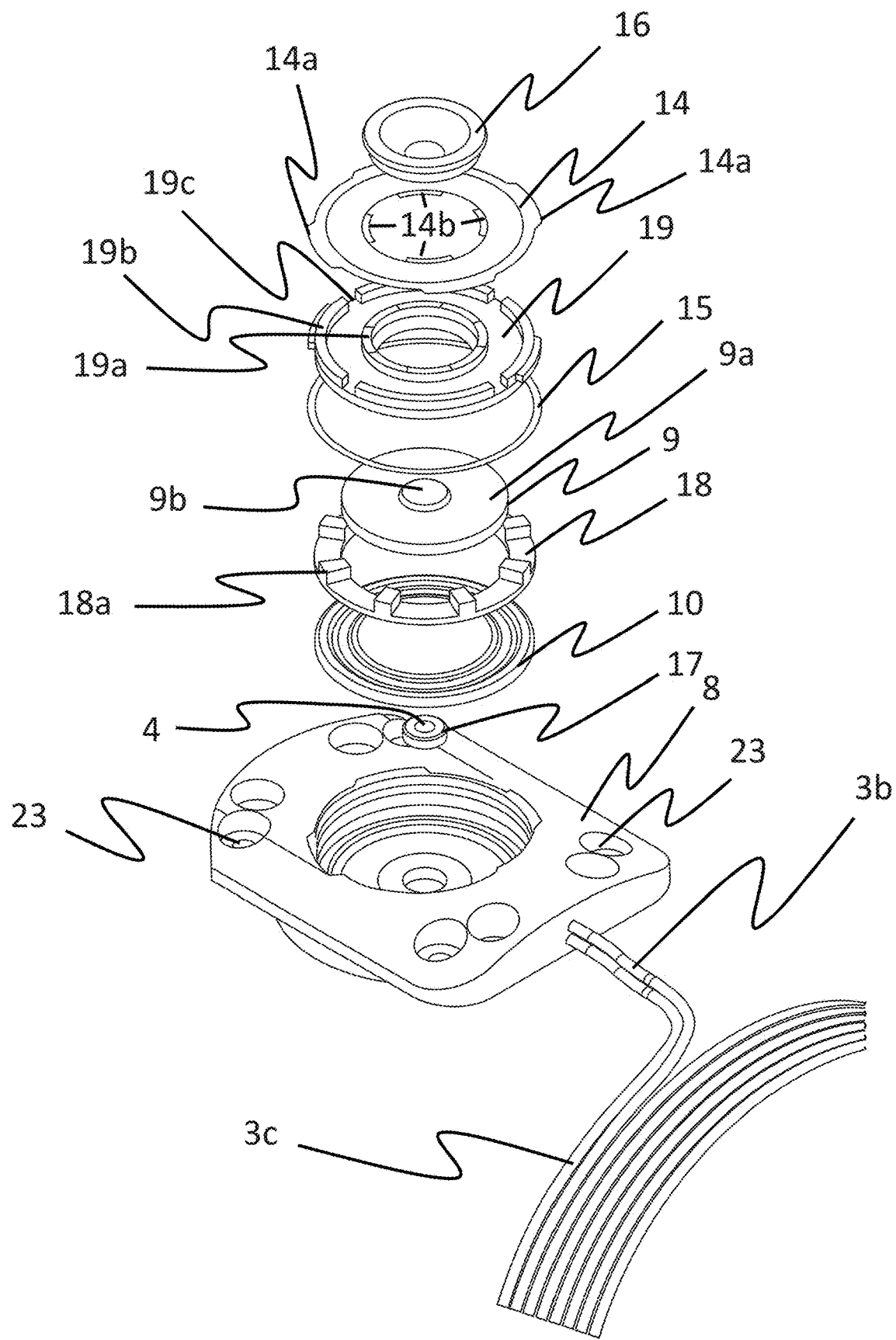
FIG. 7 shows a flow control device of the invention in an exploded view.
Figure 8A:
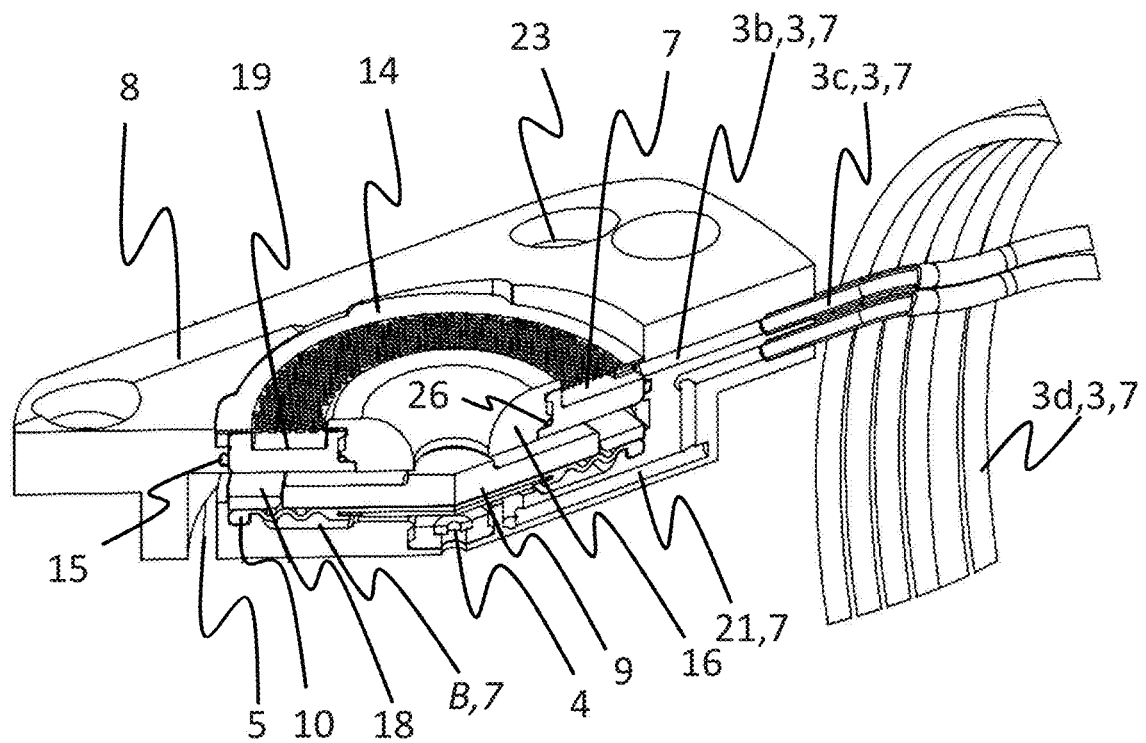
FIGS. 8A and B show a cut-out section of the flow control device of the invention in two different perspective views.
Figure 8B:
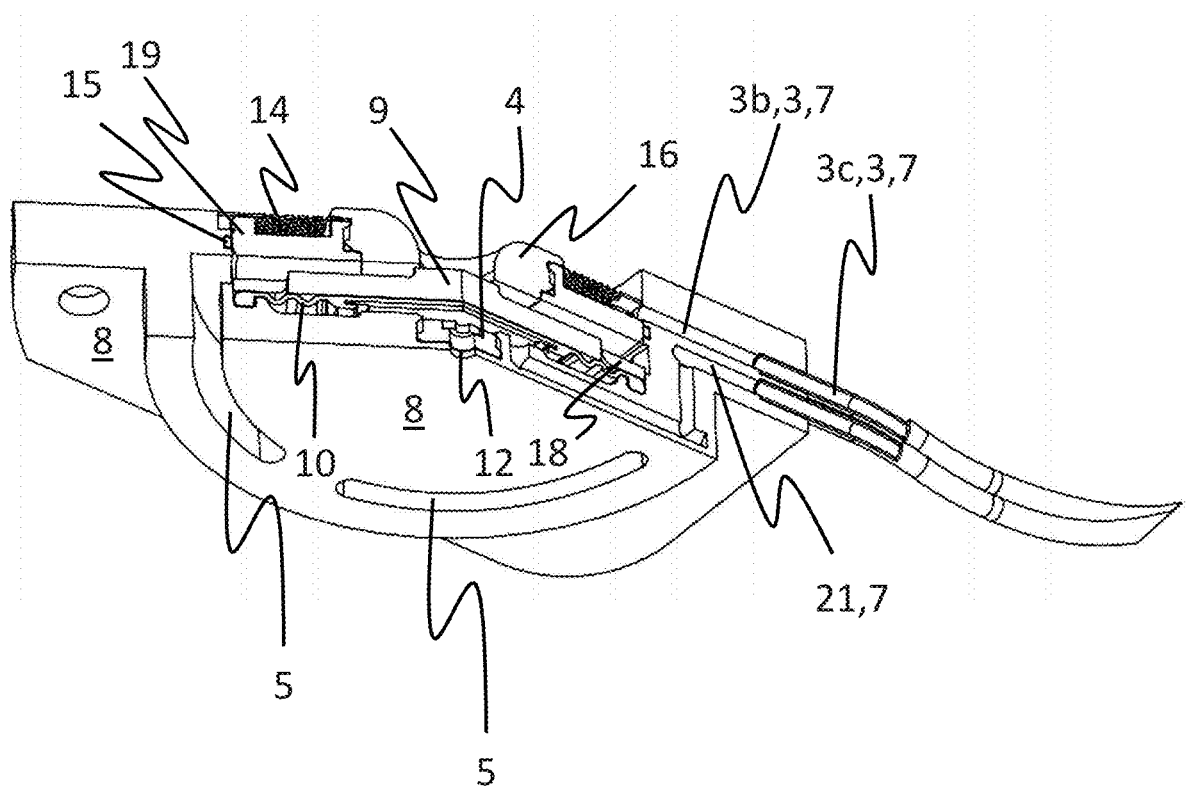

With particular reference to FIG. 7, and in conjunction with FIG. 6, the teeth 18a arranged at the outer circumference of the primary fluid flow bushing 18 are seen to act both as axial spacers between a secondary fluid flow bushing 19/the resilient member 10 and the inside wall of the housing 8, and as channel openings 18b to allow the primary fluid flow ($F_0$) to flow radially through the openings 18b between the teeth 18a.

As best seen in FIG. 7, the piston 9 comprises a lower disc 9a contacting the resilient member 10 and an upper disc 9b centrally arranged on the lower disc 9a. The outer radial diameter of the lower disc 9a is equal to, or near equal to, the inner diameter of the teethed primary fluid flow bushing 18, The upper disc 9b is arranged centrally on the lower disc 9a and has a radial diameter which is less than the radial diameter of the lower disc 9a, for example equal or slightly larger than the smallest inner diameter of the primary flow path inlet 1 and/or equal or less than half the diameter of the lower disc 9a.

An example of a slightly larger diameter of the upper part of the piston 9 may be a diameter less than 10% larger than the smallest inner diameter of the primary flow path inlet 1.

Again, with reference to FIG. 6, the secondary flow path inlet 11 (guiding the secondary flow (f) into the secondary conduit 7) and the primary flow path inlet 1 (guiding primary fluid flow ($F_0$) into the primary conduit 2) are shown physically separated. This particular configuration of the two inlets 1,11 are considered space efficient since the axial thickness ($t_{AICD}$) of the housing 8 does not need to accommodate also the inlet diameter of the secondary flow path inlet 11.

The primary flow path inlet 1 is in FIG. 6 shown as a separate inlet bushing 16 creating a funnel shaped inlet opening with smoothed inner wall(s) ensuring a minimum of turbulence during operation. Again, a smoothed inner wall signifies a wall void of sharp edges and/or pointed protrusions.

To avoid plugging of the secondary conduit 7, a ring-shaped filter 14 comprising a fine-masked mesh covers the secondary flow path inlet 11, thereby hindering any particles having a diameter larger than the mesh size to enter the secondary conduit 7. The mesh size should be significantly smaller than the smallest cross sectional areal of the secondary conduit 7. Note that fine-masked mesh may be any object allowing filtering of particles, for example a mesh composed of wires, a perforated plate, or a combination thereof.

With reference to FIGS. 4-8, the interior part 3b of the first fluid flow restrictor 3 is set up by the secondary fluid flow bushing 19 having an inner center opening for the primary fluid flow ($F_O$). The secondary fluid flow bushing 19 comprises one or more first locking edges 19a running along the circumference of the inner center opening, and a second locking edge 19b or a plurality of locking teeth 19b running along the outer circumference of the secondary fluid flow bushing 19 creating at least one bushing opening 19c through which the secondary flow (f) may flow after having entered the secondary flow path input 11.

In this exemplary configuration, the radially arranged outer second locking edge or locking teeth 19b is/are inserted into dedicated recesses in the housing 8 and subsequently rotated such that the edge/teeth 19b are guided into tracks and locks the bushing 19, thereby preventing any axial displacements.

Further, to assure that the bushing 19 is not attaining any undesired rotational position during and/or after positioning, the aforementioned filter 14 has in this configuration an additional purpose aside from filtering out solid particles from the secondary flow. As is most apparent from FIGS. 7 and 8, the filter 14 comprises one or more outer protrusions 14a protruding radially outward from the outer circumference of the filter 14 and one or more inner protrusions 14b protruding radially inward from the inner circumference of the filter 14.

By fitting the inner protrusion(s) 14b within the inner locking edge(s) 19a of bushing 19, a rotational locking effect is achieved. Further, the outer protrusion(s) 14a may be inserted into the above mentioned recess(es), thereby fixing the filter 14 to the housing 8.

The fluid flow control device 100 may also comprise a bushing seal 26, for example an O-ring, sealingly arranged between the bushing 19 and the inlet bushing 16 (see FIG. 8A), thereby preventing any undesired leakage between the primary flow path 2 and the secondary flow path 8 during operation.

The secondary fluid flow bushing 19 is sealed from the housing 8 by an O-ring 15 running along the outer circumference of the secondary fluid flow bushing 19, beneath, or partly beneath, the locking edge 19b or plurality of locking teeth 19b.

The bushing opening 19c, or at least one of the plurality of bushing openings 19c, is aligned with the outlet channel(s) constituting the interior part 3b of the first fluid flow restrictor 3. Hence, the secondary fluid flow (f) passes through one or more of the aligned bushing openings 19c, and further into the interior part 3b. The secondary flow (f) subsequently flows into the exterior straight part 3c situated outside the housing 8, through the exterior coiled part 3d, and back into the housing 8 via one or more return channels 21 within the housing 8. The return channel 21 guides the secondary fluid flow ($f_{lam}$) via the chamber B situated beneath the piston 9 and the resilient member 10, through a second fluid flow restrictor 4 in form of an orifice and out through the secondary flow path outlet 12. The orifice 4 is arranged in an outlet bushing 17 being fixed in fluid communication with the secondary flow path outlet 12. The orifice 4 may be adjustable, thereby enabling adjustment of the degree of turbulence of the secondary fluid flow ($f_{tur}$).

In order to fix the flow control device 100 onto the base pipe 102, the housing 8 displays a plurality of through-going apertures 23 configured receive fixing means such as threaded screws or bolts (not shown).

In use, a fluid flow F (e.g. oil from a subterranean reservoir) is divided into a primary fluid flow $F_O$ entering the housing 8 through the primary flow path inlet 1 and a minor secondary fluid flow f entering the housing 8 through the secondary flow path inlet 11. Inside the housing 8, the primary fluid flow $F_O$ follows the primary conduit 2 before it exits the housing 8 through the primary flow path outlet(s) 5 and into the base pipe 102.

The remaining portion of the fluid flow F, the secondary fluid flow f, flows through the secondary conduit 7, i.e. through the filter 14, the secondary fluid flow bushing 19, the coiled pipe 3, the return channel 21, the chamber B, the orifice 4 and finally into the base pipe 102 via the secondary flow path outlet(s) 12. If water and/or gas enters the flow F, causing the overall viscosity μ to drop, the resulting difference in values for $p_2$ ($\Delta P_2$, see FIG. 2) is serving to exert a pressure force against an actuating surface 6 of the piston 9 and the diaphragm 10 facing away from the inlets 1,11 (see thick line in FIG. 6). This change in pressure acting on the actuating surface 6 generates a motive force which serves to force the upper part 9b of the piston 9 towards the primary flow path inlet 1, thus preventing further primary fluid flow $F_O$ from entering the housing 8. The diaphragm 10 insures a prevailing resilient force or biasing force on the piston 9 which is directed away from the primary flow path inlet 1. As a result, the piston 9 remains in an open position relative to the primary flow path inlet 1 when the primary fluid flow $F_O$ is absent or small enough not to counteract the resilient force.

Figure 9:
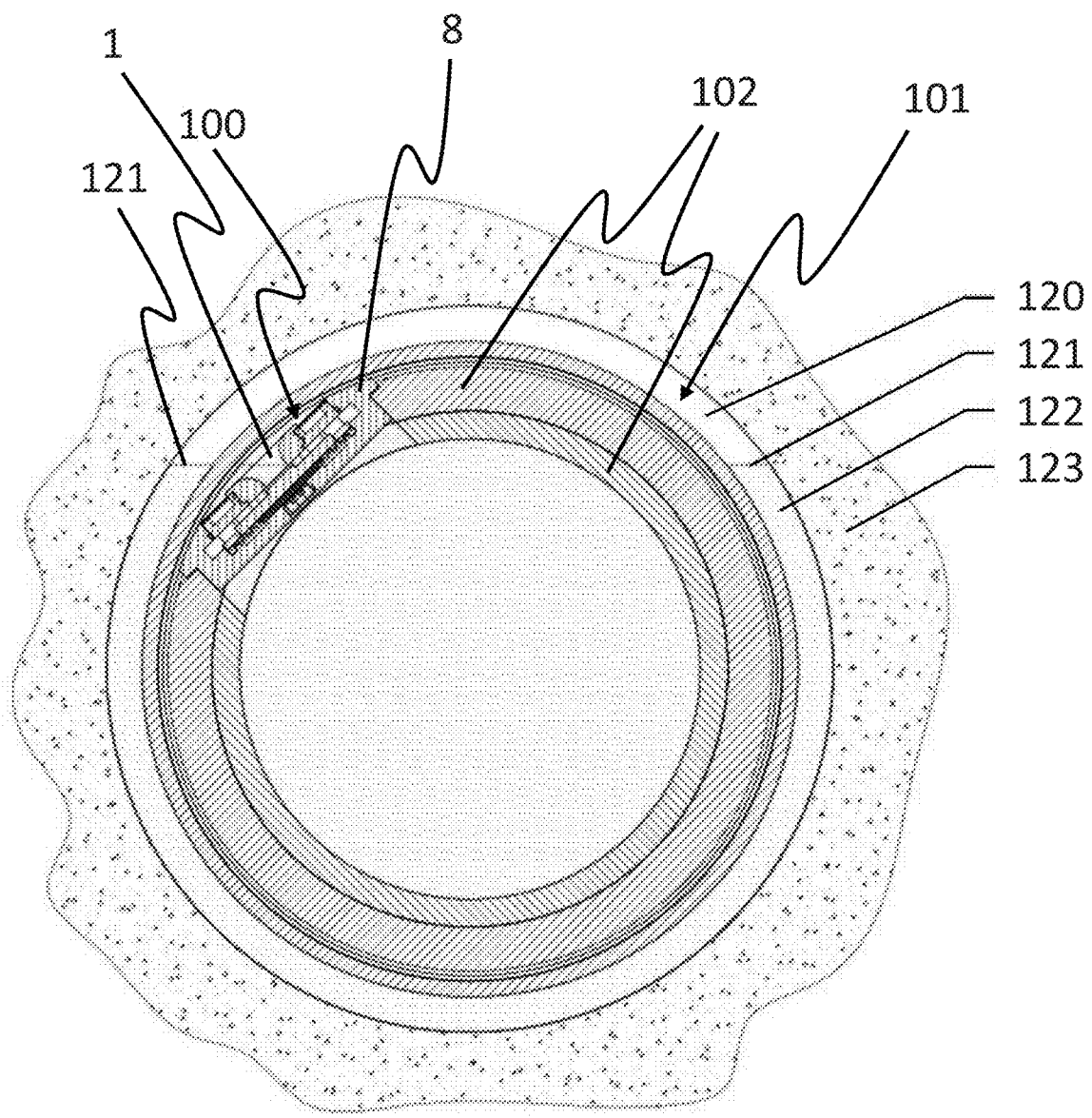
FIG. 9 shows a flow control device of the invention in a tilted arrangement within a base pipe relative to a low viscosity—high viscosity fluid interface within a reservoir.
Figure 10:
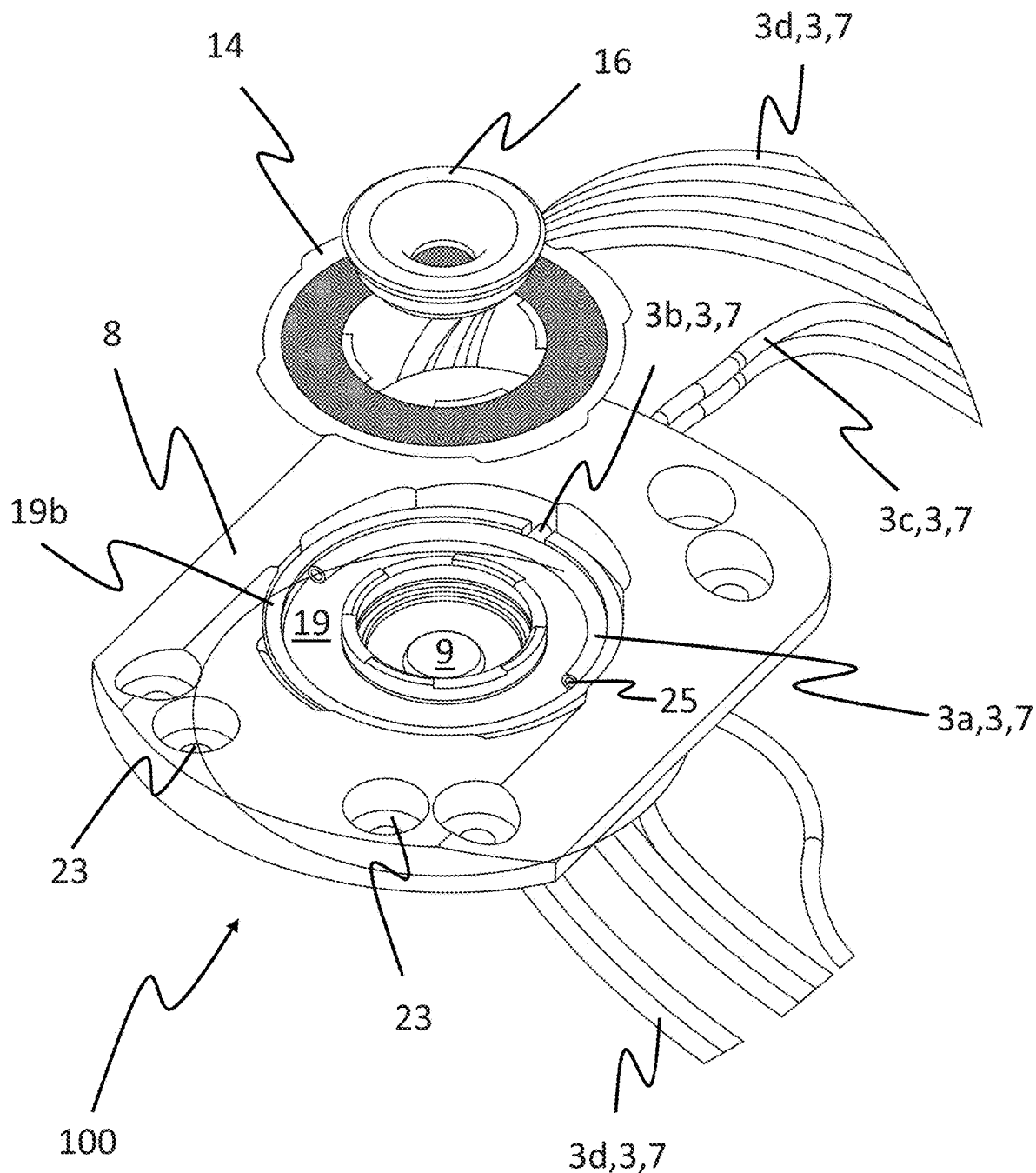
FIG. 10 shows an exploded view of a flow control device having a multi inlet channel arranged within a secondary flow path.

FIGS. 9-10 illustrate a particular configuration with the aim to achieve effective and swift closing/opening of the flow control valve 100 in case of penetration of multiphase fluid such as during transition from high viscosity fluid (e.g. oil) 122 to low viscosity fluid (e.g. gas or water) 120. In FIG. 9, a production string 101 is shown within a formation 123, for example the formation of a seabed. A fluid reservoir including e.g. gas 120 and oil 122 is located between the surrounding formation 123 and the external of the production string 101. The low viscosity—high viscosity fluid interface 121 such as the gas-oil interface is indicated in FIG. 9 as a horizontal line. Further, the production string 101 comprises a base pipe 102 and a flow control valve 100 establishing a closable opening between the reservoir and the inside of the base pipe 102. The flow control device 100 is in FIG. 9 shown in a tilted position relative to the fluid interface 121, and in a position on the base pipe 102 that corresponds to a height being in level with the fluid interface 121. In this particular configuration, the fluid interface 121 is approximately located in the middle of the primary flow path inlet 1. The position of each fluid control device 100 in a base pipe 102 is random.

With particular reference to FIG. 10, in order to ensure an effective and swift closing/opening the compartment forming part of the secondary flow path 7, and set up by the secondary fluid flow bushing 19 and the inlet filter 14, contains an interior multi inlet channel 3a having at least two inlets 25 being diagonal, or near diagonal two each other relative to the fluid flow inlet 1. With the tilted arrangement shown in FIG. 9, and the interior part 3b of the coiled pipe 3 directed perpendicular to the paper of FIG. 9, the flow control device 100 would, as a result of the mutually diagonal arrangement of the two spaced apart inlets 25, be producing primarily low viscosity fluid such as gas or water 120 into the upper inlet 25. The reason is that the resistance (friction) is lower than the high viscosity fluid such as oil 122. Hence, the flow velocity of the low viscosity fluid is higher, causing a more rapid closure of the flow control device 100 in case of multi-phase flow.

Note that for all the above embodiments the invention is not limited to specific material or a specific geometry. In fact, any choice of material and/or geometry is possible as long as one of the restrictors creates a mainly laminar flow and the other restrictor creates a mainly turbulent flow during operation. Also, even if directional words such as beneath, radial and axial are used with reference to the drawings, in should be understood that these words are used only for clarity and should not be interpreted as limiting the directional position of the inventive control device.

All of the embodiments of the inventive flow control device described above are autonomous in the sense that they move (to close or open a fluid inlet) based on a changing property (e.g. viscosity μ) of the fluid F. The coiled pipe 3, the orifice 4, the internal dimensions of the housing 8 and the internally arranged bushings 18,19 may be designed to suit various applications.

Figure 11A:
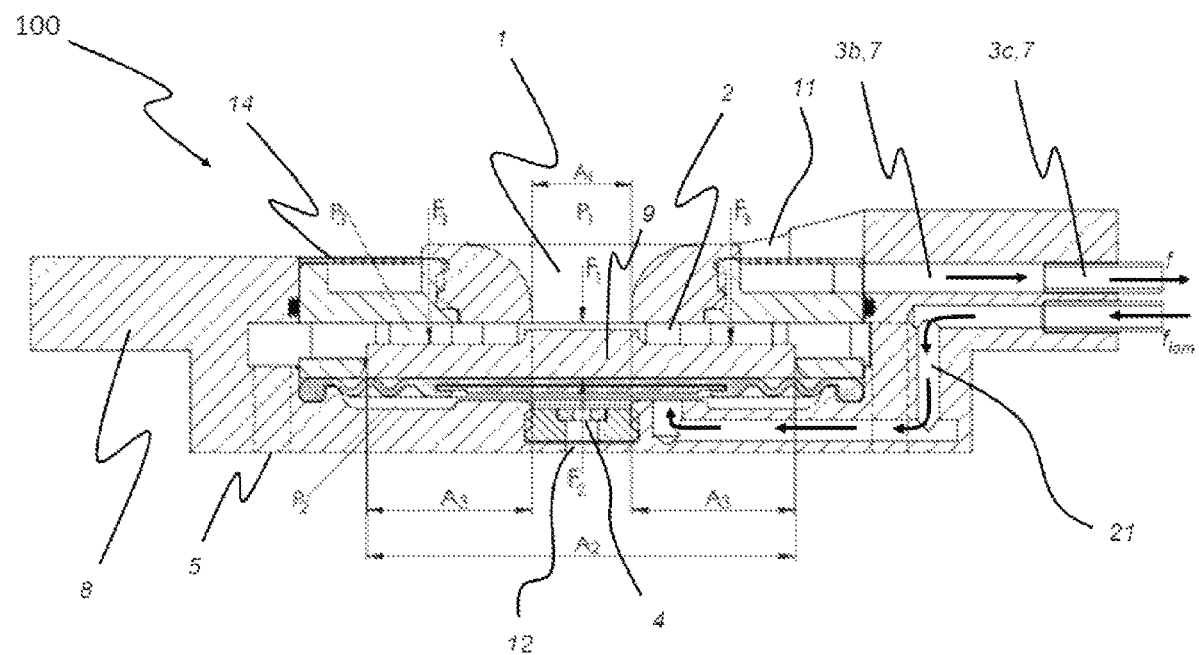
FIGS. 11A-C shows results of measurements indicative of the efficiency of the closing and opening properties during flow of high viscosity fluids such as oil and low viscosity fluids such as gas and/or water, where
Figure 11B:
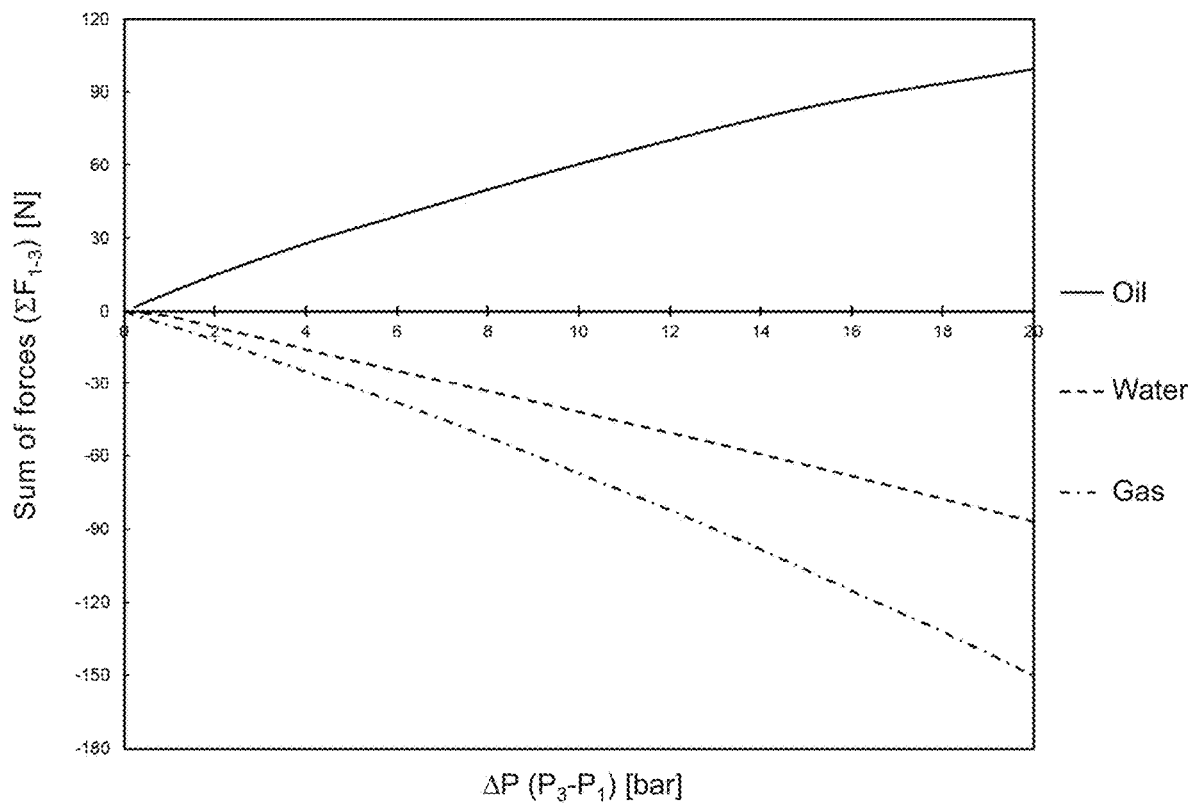
Figure 11C:
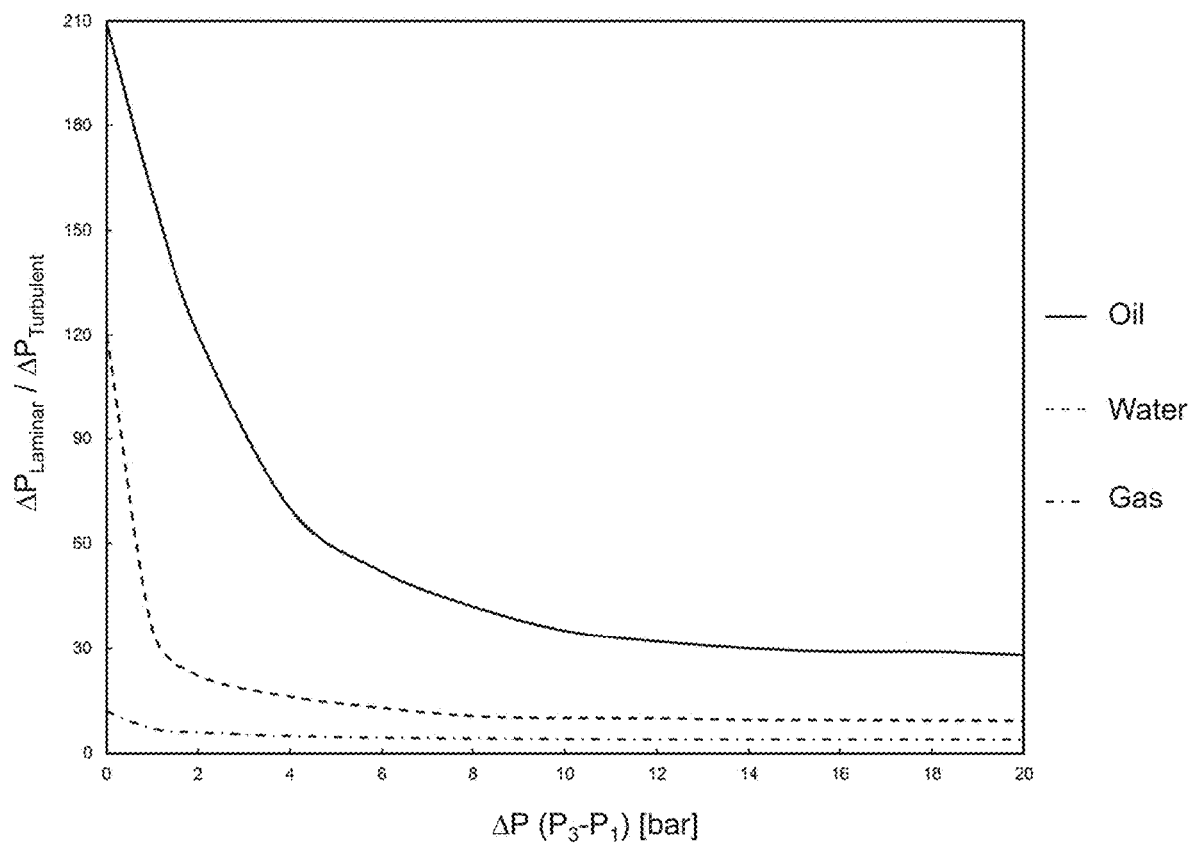

As an example of measurement results using the inventive flow control device 100, reference is made to FIGS. 11A, 11B and 11C.

FIG. 11A is a principal drawing of the inventive autonomous flow control device 100 configured for stopping low viscosity fluids such as gas and water from entering the desired flow phase of high viscosity fluids such as oil, and where the various forces $F_1$, $F_2$, $F_3$, set up by the fluid flows are indicated, together with the corresponding pressures $P_1$, $P_2$, $P_3$ and cross-sectional areas $A_1$, $A_2$, $A_3$.

FIG. 11B shows the measured net force $\Sigma F_{1-3}$ acting on the movable piston 9 (vertical axis) as a function of pressure drop ($p_3-p_1$) across the flow control device 100 (horizontal axis). The values of the net force and the pressure drop is given in Newtons and bars, respectively.

The net force represents the sum of the forces $\Sigma F_{1-3}$ on the piston 9 that opens the flow control device 100 when $\Sigma F_{1-3}$ is positive and closes the flow control device 100 when $\Sigma F_{1-3}$ is negative. FIG. 11B shows that, while the fluid control device 100 is open when subjected to oil (high viscosity fluid), it closes almost instantaneously when subjected to gas and water (low viscosity fluid).

$\Sigma F_{1-3}$ is based on the measurements of the pressure drop ($p_3-p_1$) in the laminar flow element 3 and the turbulent flow element 4 respectively, both arranged within the secondary flow path 7. FIG. 11C shows the laminar and turbulent pressure drop ratio $\Delta P_{laminar}/\Delta P_{turbulent}$ for a given fluid (vertical axis) as a function of the pressure drops given in FIG. 11B (horizontal axis). Based on $\Sigma F_{1-3}$ it can be calculated that the flow control device 100 opens when:

$$P_1 \cdot A_1 + P_3 \cdot A_3 - P_2 \cdot A_2 > 0$$

These measurement examples are intended to illustrate the function of the inventive flow control device 100. It should be understood that the fluid flow restrictors 3,4 may be arranged and configured differently. For example, the fluid flow restrictors 3,4 may be reversed in the flow path if the device is intended to be used in a gas reservoir and it is desirable to prevent higher viscosity fluid such as water from entering the production.

It should also be understood that the inventive flow control device 100 may be arranged and configured to control and prevent the inflow of other fluids, such as $CO_2$ (which has been injected into the reservoir) and steam (injected in connection with e.g. so-called Steam-Assisted Gravity Drainage (SAGD) of heavy oil), and water in gas-producing wells.

Although the invention has been described with reference to the control of well fluids (such as oil, gas, water) from a subterranean reservoir, the skilled person will understand that the invented device and its method may be useful in any application where the objective is to control fluid flow based on the properties (e.g. viscosity, density) of the various fluids in the flow to prevent unwanted fluids from entering a fluid flow. Examples of such applications are injection wells, separation processes and steam traps.

REFERENCE NUMERALS

F Fluid flow
$F_0$ Major portion of fluid flow/main fluid flow/primary fluid flow
f Smaller portion of fluid flow/pilot fluid flow/secondary fluid flow
$p_1$ First pressure
$p_2$ Second pressure (between first and second fluid flow restrictors)
$p_3$ Third pressure
$\Delta P_2$ Pressure difference in $p_2$ generated due to change in fluid properties
B Chamber
$t_{AICD}$ Axial thickness of fluid control device housing 8
1 Fluid flow inlet/primary flow path inlet
2 Conduit/primary flow path/primary conduit
3 First fluid flow restrictor/coiled pipe/coiled thin tube
3a Interior multi inlet channel/multi inlet channel/multi inlet pipe
3b Interior section of the first fluid flow restrictor 3/interior part
3c Exterior straight part of the first fluid flow restrictor 3/exterior pipe
3d Exterior coiled part of the first fluid flow restrictor 3/exterior pipe
4 Second fluid flow restrictor, orifice
5 Fluid flow outlet/primary flow path outlet
6 Actuator/actuating surface
7 Secondary flow path/secondary conduit
8 Fluid control device housing/housing
9 Piston/valve element/movable disc
9a Lower disc of piston 9
9b Upper disc of piston 9
10 Hydraulic/electrical/mechanical transmission means (for transmitting pressure force)/resilient member/semi-flexible material/diaphragm
11 Secondary flow path inlet
12 Secondary flow path outlet
13 Interior outlet channel
14 Filter/inlet filter
14a Outer protrusion(s) of filter 14
14b Inner protrusion(s) of filter 14
15 Sealing means/O-ring
16 Inlet bushing
17 Outlet bushing
18 Primary fluid flow bushing/second ring-shaped disc
18a Bushing teeth arranged the outer circumference of the primary fluid flow bushing 18/axial directed edge 18b Bushing openings along the outer circumference of the primary fluid flow bushing 18/opening in axial directed edge/channel opening
19 Secondary fluid flow bushing/first ring-shaped disc
19a Inner locking edge along the circumference of the inner opening of the secondary fluid flow bushing 19/first locking edge
19b Outer locking edge/locking teeth along the outer circumference of the secondary fluid flow bushing 19/second locking edge
19c Bushing openings along the outer circumference of the secondary fluid flow bushing 19
21 Interior return channel/return channel
23 Aperture for insertion of fixing mean to fix housing 8 to base pipe 102
25 Opening/inlet to interior multi inlet channel
26 Bushing seal
100 Flow control device
101 Production string
102 Base pipe
103 Sand screen
104 First inner sleeve/enclosure
105 Inner sleeve fluid channel
106 Sand screen fluid channel
107 Second inner sleeve/enclosure
108 End cap/enclosure
109 Closed input chamber
110 Outer sleeve
111 Inner sleeve opening/enclosure input opening
120 Gas or Water, Low viscosity fluid
121 Gas or Water/Oil interface, Low viscosity/High viscosity fluid interface
122 Oil, High viscosity
123 Formation

The invention claimed is:

1. A fluid flow control device for opening or closing a fluid communication of a fluid flow (F) between an external fluid reservoir and a base pipe of a production string, comprising
a primary flow path arranged inside a fluid control device housing, the primary flow path comprising
a primary flow path inlet configured to guide a primary fluid flow ($F_O$) axially into the fluid control device housing from the external fluid reservoir during operation, wherein the axial and a radial direction being defined as the direction perpendicular and parallel to the longitudinal direction of the base pipe, respectively, and
a primary flow path outlet configured to guide the primary fluid flow ($F_O$) into the base pipe during operation,
a secondary flow path comprising a first fluid flow restrictor configured to generate a pressure decrease from a pressure $p_1$ upstream of the first fluid flow restrictor to a pressure $p_2$ downstream of the first fluid flow restrictor, a second fluid flow restrictor arranged downstream of the first fluid flow restrictor and configured to generate a pressure decrease from the pressure $p_2$ upstream of the second fluid flow restrictor to a pressure $p_3$ downstream of the second fluid flow restrictor and a chamber arranged downstream of the first fluid flow restrictor and upstream the second fluid flow restrictor and
a movable valve element arranged inside the fluid control device housing and configured to close the primary flow path for fluid flow when exposed to a pressure force from within the chamber exceeding a threshold pressure force, wherein the movable valve element comprises a resilient member ensuring a prevailing resilient force on the movable valve element directed away from the primary flow path inlet,
wherein
the secondary flow path comprises a secondary flow path inlet arranged within the fluid control device housing having a radial offset to the primary flow path at an entrance of the secondary flow path inlet into the fluid control device housing and
wherein the secondary flow path inlet is further configured to guide a secondary fluid flow (f) from the fluid reservoir into the secondary flow path of the fluid control device housing
such that, during operation, the fluid flow (F) is divided into
the primary fluid flow ($F_O$) entering the fluid control device housing via the first fluid path and
the secondary fluid flow (f) entering the fluid control device housing via the secondary fluid path.

2. The fluid flow control device in accordance with claim 1, wherein the secondary flow path inlet is oriented such that the secondary fluid flow (f) flows axially into the fluid control device housing during operation.

3. The fluid flow control device in accordance with claim 1, wherein the flow control device further comprises
an inlet bushing arranged axially within the flow control device housing or guiding the primary fluid flow ($F_O$) therethrough and
a first ring-shaped disc arranged axially beneath the secondary flow path inlet, the first ring shaped disc having an opening centered around the inlet bushing, the first ring-shaped disc comprising
an axial directed first locking edge along the circumference of the centered opening of the first ring-shaped disc.

4. The fluid flow control device in accordance with claim 3, wherein the fluid flow control device further comprises
a second ring-shaped disc having an opening centered around the outer circumference of the movable valve element, the second ring-shaped disc comprising
an axial directed projection extending along the outer circumference of the second ring-shaped disc configured to create a fixed axial distance between the second ring-shaped disc and the first ring shaped disc wherein the axial directed projection creates at least one radial opening between the first and second ring shaped discs, configured to guide the primary fluid flow ($F_O$) flowing through the primary flow path inlet from the movable valve element towards the primary flow path outlet.

5. The fluid flow control device in accordance with claim 3, wherein the first ring-shaped disk further comprises
an axial directed second locking edge along the outer circumference of the first ring-shaped disc having at least one opening configured to guide the secondary fluid flow (f) flowing through the secondary flow path inlet into the fluid flow restrictor during operation.

6. The fluid flow control device in accordance with claim 1, wherein the fluid flow control device further comprises
a filter arranged across the secondary flow path inlet for preventing solid state particles within the fluid flow (F) to enter the secondary flow path, while allowing the primary fluid flow ($F_O$) to flow unfiltered through the primary flow path inlet during operation.

7. The fluid flow control device in accordance with claim 1, wherein one of the first and second fluid flow restrictors comprises a pipe of length L and a mean hydraulic diameter $\langle D_L \rangle$ averaged across the length L, wherein the length (L) and the mean hydraulic diameter ($\langle D_L \rangle$) are chosen to achieve a laminar flow characteristic flowing out of the one of the first and second fluid flow restrictors.

8. The fluid flow control device in accordance with claim 1, wherein one of the first and second fluid flow restrictors comprises a pipe of length L and a mean hydraulic diameter $\langle D_L \rangle$ measured across the length L, wherein the length (L) and the mean hydraulic diameter ($\langle D_L \rangle$) are chosen to achieve a ratio between the length L and the mean hydraulic diameter $\langle D_L \rangle$ that results in a Reynold number of the fluid flow (RE) being equal or less than 4000, the Reynold number being defined as $$RE = \langle D_L \rangle \left( \frac{Q}{\langle A_L \rangle} \cdot \frac{\rho}{\mu} \right)$$

where

Q is as the volumetric flow rate Q (m³/s), $\langle A_L \rangle$ is the mean cross-sectional wetted area across the length L (m/s), $\langle D_L \rangle$ is the mean hydraulic diameter across the length L (m)

ρ is the density of the fluid flow rate (kg/m³) and

μ is the dynamic fluid viscosity (kg/m·s).

9. The fluid flow control device in accordance with claim 1, wherein the first fluid flow restrictor comprises an interior outlet channel located inside the fluid control device housing being in fluid communication with the secondary flow path inlet, an exterior pipe of length L* located outside the fluid control device housing being in fluid communication with the interior outlet channel and an interior return channel located inside the fluid control device housing, the interior return channel being in fluid communication with the exterior pipe, wherein a section of the exterior pipe is coiled.

10. The fluid flow control device in accordance with claim 1, wherein the secondary flow path comprises a secondary flow path outlet and that more than 70% of the length of the secondary flow path from the secondary flow path inlet and the secondary flow path outlet is located outside the fluid control device housing.

11. The fluid flow control device in accordance with claim 1, wherein the movable valve element comprises a lower disc having a disc surface facing towards the chamber B and an upper disc arranged with one disc surface on the lower disc and the other disc surface facing the primary flow path inlet, wherein the disc diameter of the upper disc is smaller than the disc diameter of the lower disc and wherein the axial transition between the lower disc and the upper disc is smooth.

12. The fluid flow control device in accordance with claim 1, wherein the first fluid flow restrictor comprises a multi-inlet pipe displaying at least two radially spaced apart inlets being in fluid communication with the secondary fluid flow (f) flowing through the secondary flow path inlet.

13. The fluid flow control device in accordance with claim 1, wherein the first fluid flow restrictor comprises a multi-inlet pipe displaying at least two inlets arranged diagonally, or near diagonally, around the primary flow path inlet, the at least two inlets being in fluid communication with the secondary fluid flow (f) flowing through the secondary flow path inlet, an interior outlet channel arranged inside the fluid control device housing, being in fluid communication with the multi-inlet pipe, an exterior pipe of length L* arranged at least partly outside the fluid control device housing, being in fluid communication with the interior outlet channel and an interior return channel located inside the fluid control device housing, the interior return channel being in fluid communication with the exterior pipe.

14. A production string for transport of hydrocarbons, wherein the production string comprises abase pipe having an exterior wall, an enclosure arranged at the exterior wall of the base pipe having at least one enclosure input opening and a fluid flow control device in accordance with claim 1, the base pipe recited in claim 1 being the base pipe recited herein, wherein the fluid flow control device is arranged into a through-going hole of the exterior wall of the base pipe within the enclosure such that an openable or closeable fluid communication is obtained between the enclosure and the interior of the base pipe, and wherein the enclosure is configured to provide an input chamber covering the at least one enclosure input opening of the enclosure and covering the primary flow path inlet and the secondary flow path inlet of the fluid flow control device.

15. A method of controlling fluid flow (F) based on changes in fluid properties using a fluid flow control device in accordance with claim 1, the method comprises the steps:

guiding the primary fluid flow ($F_0$) constituting a major portion of the fluid flow (F) through the primary flow path within the fluid flow control device housing; and guiding the secondary fluid flow (f) through the secondary flow path, the secondary flow path comprising flow restrictors responsive to a change in one or fluid properties of the secondary fluid flow in order to selectively open or close the primary fluid flow path, wherein a major portion of the length of the secondary flow path extends outside the fluid control device housing.

* * * * *